United States Patent [19]

Freeman

[11] Patent Number: 4,591,248

[45] Date of Patent: May 27, 1986

[54] DYNAMIC AUDIENCE RESPONSIVE MOVIE SYSTEM

[76] Inventor: Michael J. Freeman, 31 Cornwall La., Sands Point, N.Y. 11050

[21] Appl. No.: 489,170

[22] Filed: Apr. 27, 1983

Related U.S. Application Data

[63] Continuation-in-part of Ser. No. 371,415, Apr. 23, 1982, abandoned, Continuation-in-part of Ser. No. 321,478, Nov. 16, 1981, abandoned.

[51] Int. Cl.⁴ .................... G03B 19/18; G03B 21/32
[52] U.S. Cl. ....................................... 352/133; 352/5; 352/92; 273/311; 434/321
[58] Field of Search ............... 352/5, 133, 92; 73/647; 273/311; 434/319, 321

[56] References Cited

U.S. PATENT DOCUMENTS

| | | | |
|---|---|---|---|
| 2,590,460 | 3/1952 | Rackey et al. | 73/647 |
| 3,301,628 | 1/1967 | Hellmund | 352/92 |
| 3,309,163 | 3/1967 | White | 352/92 |
| 3,602,582 | 8/1971 | Torricelli | 352/133 |
| 3,735,503 | 5/1973 | Dow et al. | 434/321 |
| 3,947,972 | 4/1976 | Freeman | 434/321 |
| 3,960,380 | 6/1976 | Yokol | 273/311 |
| 4,078,315 | 3/1978 | McFadden | 434/319 |
| 4,078,316 | 3/1978 | Freeman | 434/319 |
| 4,117,605 | 10/1978 | Kurland et al. | 434/319 |
| 4,305,131 | 12/1981 | Best | 352/5 |
| 4,333,152 | 6/1982 | Best | 352/5 |

FOREIGN PATENT DOCUMENTS

| | | | |
|---|---|---|---|
| 2317626 | 11/1974 | Fed. Rep. of Germany | 434/321 |
| 1096752 | 12/1967 | United Kingdom | 434/321 |

OTHER PUBLICATIONS

*AUDIO*, Mar. 1950, pp. 33–36, Article by Guy S. Cornish entitled "Applause Meter" 73-647.

Primary Examiner—Monroe H. Hayes
Attorney, Agent, or Firm—Stiefel, Gross, Kurland & Pavane

[57] ABSTRACT

A movie changeover system (20,200,2004,400) capable of providing a real time decision tree movie presentation having a variable movie display content dependent on the viewing audience response to branching choices which occur during the course of the movie. A pair of movie projection devices (22, 24), each having an associated portion of a substantially continuous overall motion picture presentation therefrom, has stored thereon a projectable portion of the overall motion picture presentation content. A changeover shutter mechanism (26) is operatively associated with the pair of projectors (22, 24) for selectively projecting a movie display choice of one of the projectable portions from one of the pair of projectors (22, 24) in a real time continuous movie display presentation with the previous movie display portion in response to a changeover signal. Means for detecting and sampling the audience responses associated with each choice, such as a microphone (32, 34), is provided with the sampled responses corresponding to preferential signal levels. The sampled signal levels are processed (252, 252a, 254, 256, 258, 260, 262, 320f, 322, 324, 452, 416, 418, 36, 38, 264, 402) and subsequently compared (40, 266, 440) to determine which of the two levels is greater, with the resultant signal being provided (268, 274, 276, 478) to an output circuit (42, 278, 442) to which the changeover signal is provided. An audience trend preferential characteristics, depending on the manner in which the movie has been constructed, may be used to automatically generate (158, 270, 406, 408, 160, 162, 272, 276, 410, 412) a changeover signal to provide a preselected ending for the movie based on the previously indicated audience trend, or ending selection logic (424) may be employed to select an audience preferred ending.

80 Claims, 14 Drawing Figures

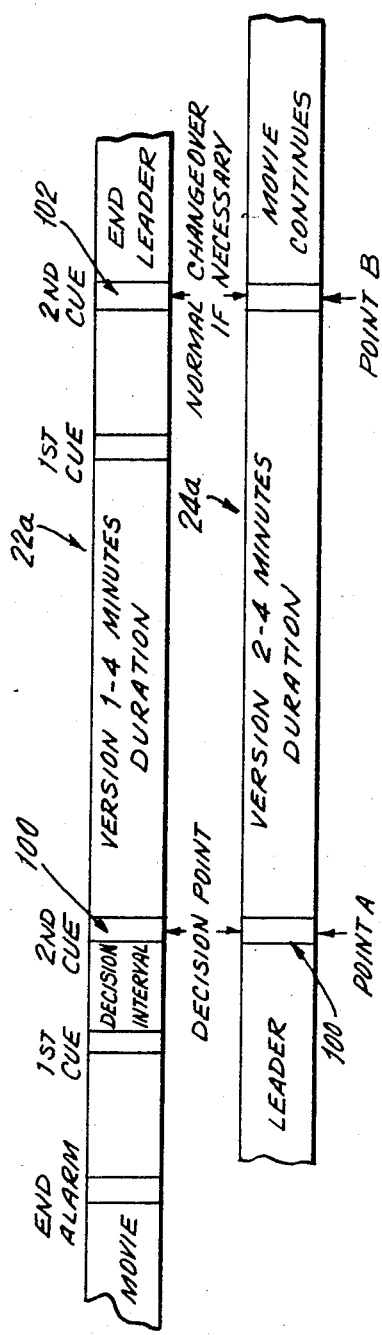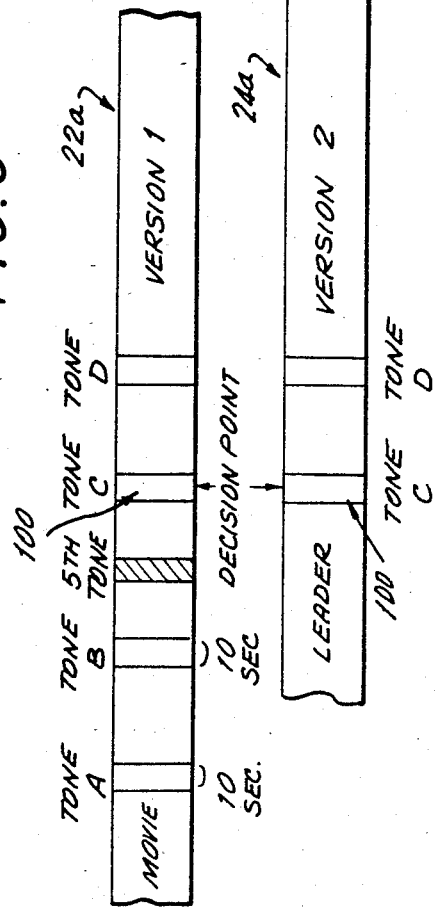
CHANGEOVER DIAGRAM
FIG. 6
TONE A — SAMPLE VOLUME INPUT 1
TONE B — SAMPLE VOLUME INPUT 2
TONE C — ACTIVATE CHANGEOVER SHUTTER
TONE D — RESET CIRCUIT
FIG. 7

DYNAMIC AUDIENCE RESPONSIVE MOVIE SYSTEM

This application is a continuation-in-part of my copending U.S. patent application Ser. No. 371,415 filed Apr. 23, 1982 and entitled "Improved Audience Responsive Movie System", now abandoned, which is, in turn, a continuation-in-part of my copending U.S. patent application Ser. No. 321,478, filed Nov. 16, 1981, and entitled "Audience Responsive Movie System", now abandoned, the contents of both of which are specifically incorporated by reference herein in there entirety, and is a further improvement thereon.

TECHNICAL FIELD

The present invention relates to movie changeover systems and particularly to such systems capable of providing a real time decision tree movie presentation having a variable movie display content dependent on the response of the viewing audience.

BACKGROUND ART

Movie changeover systems, that is systems which enable a real-time continuous change between reels during projection of a motion picture are well known in the art.

Conceptually, these prior art conventional movie changeover systems enable the projectionist to switch from one reel to another during projection of a movie which is contained on multiple reels without any such change being visably perceptible to the viewing audience. In order to accomplish this, the movie media on the reel being projected normally contains a series of cues for the projectionist located near the end of the reel with the last cue being the changeover point which is normally followed by an end leader. The reel to which the projection is being changed preferably contains a front leader prior to the last cue on the previous reel which leader is then followed by the continuation of the picture. The projectionist responds to the cues on the reel being projected to start the second projector up to speed so that when the last cue at the end of the reel being projected occurs, the projectionist can operate the changeover shutter switch to change over the movie presentation from the first reel being projected to the second reel which had been previously brought up to speed for projection. These prior art movie changeover systems, however, require that changeovers take place at a given time which is at the extreme end of the movie reels and do not enable a real time decision tree continuous movie display presentation to be provided so as to provide a variable movie display content dependent on the detected response of the viewing audience at various branching points throughout the movie. This is so despite it being known in the prior art to detect and measure audience responses, such as via a conventional applause meter or other conventional prior art polling system. However, none of these prior art polling systems is capable of providing a real time decision tree movie presentation having a variable movie display content dependant on the viewing audience response.

In addition to the above, the concept of branching in a real time environment is generally described in my prior U.S. Pat. Nos. 3,947,972 and 4,078,316, and 4,117,605 which also names Lawrence G. Kurland as an inventor thereof, and which all relate to a real time conversational toy; and in my U.S. Pat. Nos. 4,264,924 and 4,264,925, which also names Lawrence G. Kurland as an inventor thereof, and which relate to an interactive cable television system. However, none of the aforementioned patents is directed to a real time decision tree movie presentation in which a movie changeover system is capable of providing a variable movie display content dependent on the response of the viewing audience. Such a system, however is described in my copending U.S. patent application Ser. Nos. 321,478, filed Nov. 16, 1981, entitled "Audience Responsive Movie System", now abandoned and 371,415, filed Apr. 23, 1982, entitled "Improved Audience Responsive Movie System", now abandoned, with the system of the present invention being a further improvement thereon.

These disadvantages of the prior art are overcome by the present invention.

DISCLOSURE OF THE INVENTION

The present invention is a movie changeover system capable of providing a real time decision tree movie presentation having a variable movie display content dependent on the viewing audience response to branching choices which occur during the course of the decision tree movie presentation. A pair of movie projection devices, each having an associated movie media for projecting an associated portion of a substantially continuous overall motion picture presentation therefrom may be employed in such a system with each of the movie media having stored thereon a projectable portion of the overall motion picture presentation content. A real time changeover means, such as a changeover shutter mechanism, is operatively associated with the pair of projectors for selectively projecting a movie display of one of the movie media projectable portions from one of the pair of projectors in a real time continuous movie display presentation with the previous movie display portion in response to a changeover signal. The stored decision tree movie presentation comprises different branching choice movie display presentation portions which are stored at various common decision tree movie display branching points on the movie media. Each one of the pair of branching choice movie display presentation portions has a different movie display content which may relate to different endings for the movie or different scenes during the movie and which is commonly associated with the movie display portion content preceeding the common decision tree movie display branching point. The pair of branching choices are preferably substantially coextensive in movie display time from the common decision tree movie display branching point. The preceeding movie display portion content comprises a sampling interval prior to the common decision tree movie display branching point for sampling audience response of preferential selection of the available branching choices. Means for detecting and sampling the audience responses associated with each choice, such as a microphone for detecting the audio level of the sampled audience response, and/or frequency dicrimination circuitry for discriminating between concurrently sampled audience response, is provided with the sampled responses corresponding to preferential signal levels dependent on the associated audience response. The sampled signal levels are provided to a common sample and hold circuit from which they are subsequently compared, such as in a voltage comparator, to determine which of the two levels is greater, with the signal corresponding to this information being provided to an output circuit to which the changeover signal is provided. The output circuit provides a changeover signal if the result of the comparison operation indicates a branching choice contained on the other reel which is not then providing the previous movie display presentation. If the branching choice indicates the same reel which is then providing the movie display presentation, no changeover signal is necessary and the movie display continues from that reel until another branching point is reached at which the same type of operation again occurs. The changeover signal is preferably provided to a relay, or a solenoid, to operate the changeover shutter mechanism and associated sound relay of a conventional type of movie changeover system to changeover the projection from one reel or projector to another. The system also provides the ability to vote against a standard which has been encoded on to the movie media or prestored in a storage register so that a changeover signal would occur, where appropriate, only when the standard is exceeded by the audience response.

In addition, a storage register may be provided for incrementally storing a count each time a vote occurs which count may then be compared with a stored number. This count may be indicative of an audience trend preferential characteristic depending on the manner in which the movie has been constructed and may be used to automatically generate a changeover signal to provide a preselected ending for the movie based on the previously indicated audience trend. Thus, in such an instance, the predetermined stored number against which the incremental count is compared would be indicative of audience trend if a predetermined number of changeovers of selections were made by viewing audience for that particular movie display presentation. This could also be accomplished based on a sensed majority vote of the viewing audience or some other manner of obtaining a preweighted value. Ending selection logic may be provided for controlling selection of one of a plurality of movie ending choices, based on audience response, through a two stage process in which the audience votes for its preferential choice of ending and then the logic looks for the ending chosen, the location of the selected ending is accomplished through counter circuitry in which the counter is first incremented during the voting phase and then decremented during the location phase. If desired, the various possible endings can be stored on one reel with the other reel containing a common ending scene with which the selected choice can be readily merged in real time.

The sampling of the viewing audience at the various branching points can be automatically initiated in response to spaced frequency tones along the movie media which are decoded to activate the appropriate sampling circuitry at the proper time or could be manually initiated by activation of a switch at each of the sampling times. For example, the spaced command signals, which preferably consist of a plurality of different recognizable command functions and a command enable signal, can comprise a plurality of spaced apart digital pulses or tones, which can be discriminated between by pulse count, which enable the command circuitry. Of course, any other conventional coding technique capable of providing distinguishable command signals could be utilized. These command signals could be stored on the optical or magnetic sound track of the film, or on the film itself via visual cues or metallic tape adhesive strips, for example. Moreover, the command signals could also be separately timed within the circuit itself as opposed to being stored on the film. In either event a real time decision tree movie presentation having a variable movie display content dependent on the

BRIEF DESCRIPTION OF THE DRAWINGS

FIG. 6 is a diagrammatic illustration of the general concept of the changeover portion of the system of FIG. 1;

FIG. 7 is a diagrammatic illustration, similar to FIG. 6, of the concept of providing cue tomes on the movie sound track to accomplish automatic sampling and changeover in accordance with the control unit embodiment of FIG. 4;

BEST MODE FOR CARRYING OUT THE INVENTION

Figure 13:
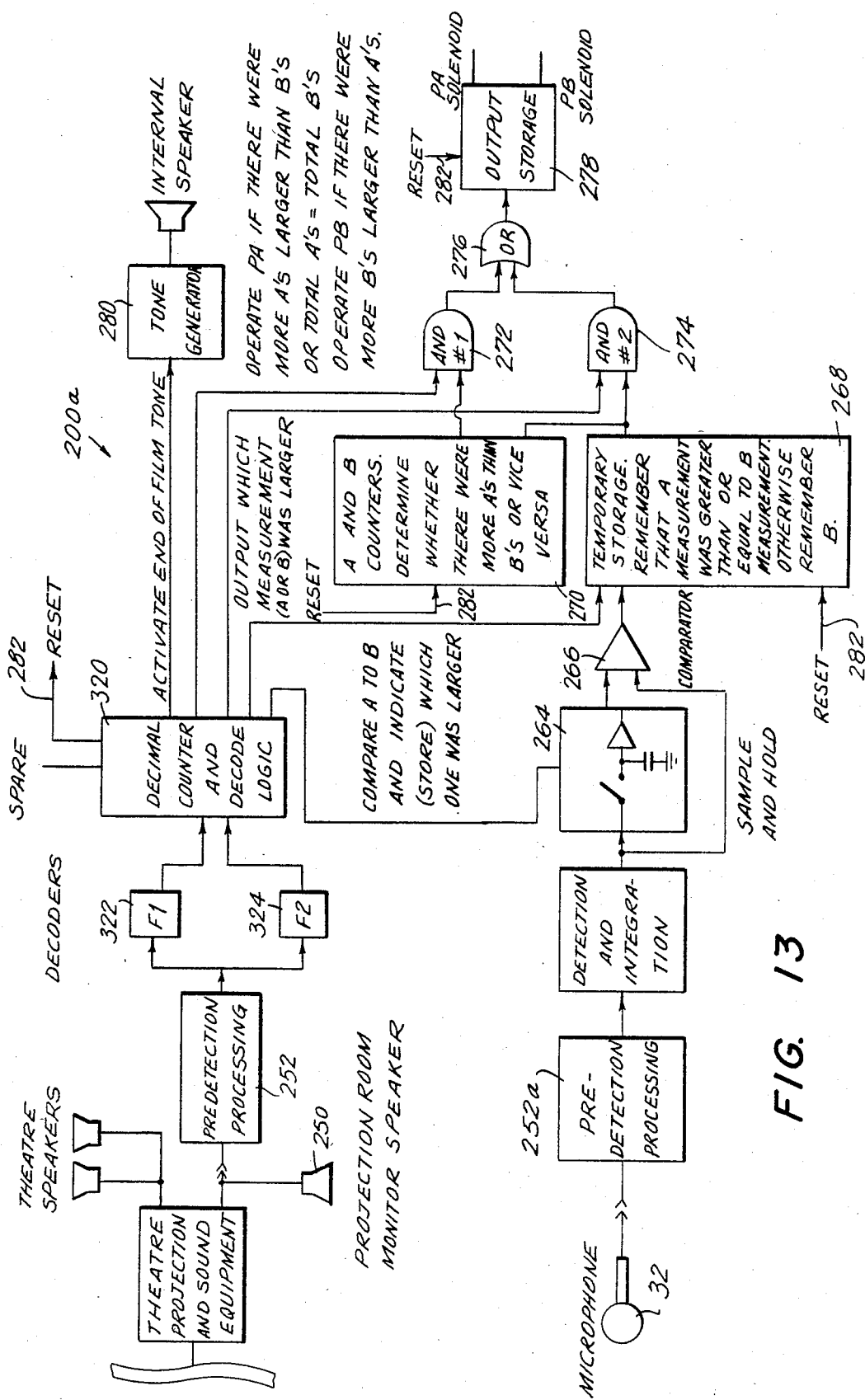
FIG. 13 is a functional block diagram, partially in schematic, similar to FIG. 11, of the burst train embodiment of the movie changeover system of the present invention in accordance with FIGS. 9 and 12.
Figure 14:
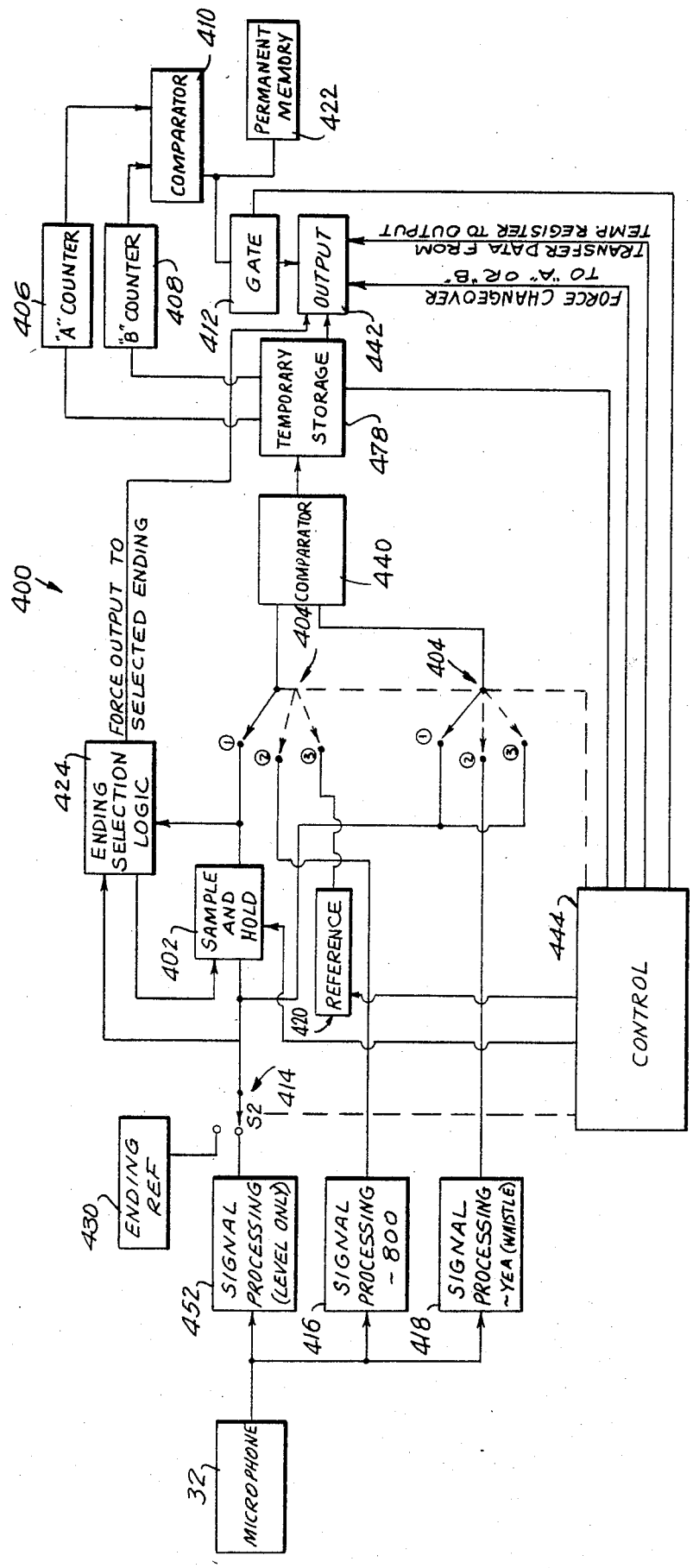
FIG. 14 is an overall functional system block diagram of the presently preferred embodiment of the system of the present invention.

For purposes of clarity, before describing the presently preferred mode of FIG. 14, which is believed to be an improved version of the movie changeover systems described in my copending U.S. patent applications Ser. No. 321,478, filed Nov. 16, 1981, and entitled "Audience Responsive Movie System", and 371,415, filed Apr. 23, 1982, and entitled "Improved Audience Responsive Movie System", now abandoned, I shall first review the function and operation of those systems with references to FIGS. 1-8, and FIGS. 9-13, respectively. Referring now to the drawings in detail and initially to FIG. 1 thereof, an overall system block diagram of the embodiment of my movie changeover system described in my aforementioned U.S. patent application Ser. No. 321,478, now abandoned, generally referred to by the reference numeral 20, is shown. The system 20 preferably includes a pair of conventional movie projectors 22 and 24, such as conventional 35 millimeter movie projectors, and a conventional changeover shutter system 26 which is normally employed with a pair of movie projectors 22 and 24 to provide a conventional movie changeover system of the type in which changeover from one movie reel to the next during projection of a multireel movie may be provided at the end of the reel then being projected. As shown and preferred in FIG. 1, this conventional movie changeover system comprising projectors 22 and 24 and changeover shutter system 26 is preferably operatively connected to an audience response analyzer system 28 which, as will be described in greater detail hereinafter, provides a changeover signal to the changeover shutter system 26 via path 30 in order to enable changeover between the movie projectors 22 and 24 to occur during the course of a decision tree movie presentation in response to decisions made by the viewing audience at various branching points during the course of the movie.

Figure 1:
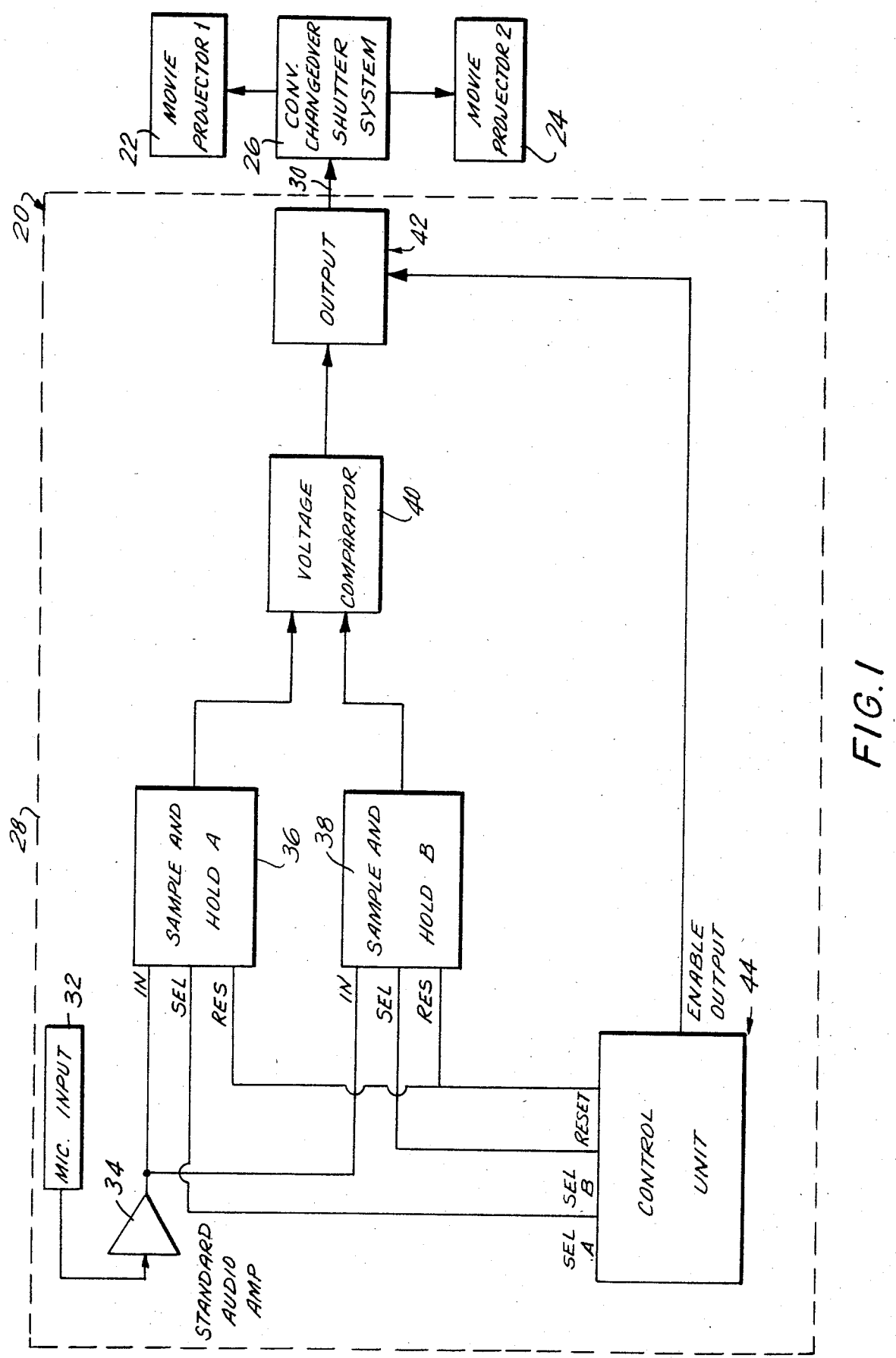
FIG. 1 is an overall functional system block diagram of the system of the present invention as disclosed in my copending U.S. patent application Ser. Nos. 321,478, filed Nov. 16, 1981, entitled "Audience Responsive Movie System", and 371,415, filed Apr. 23, 1982, and entitled "Improved Audience Responsive Movie System"

The audience response analyzer system 28, preferably includes a conventional or wireless microphone input 32 and audio amplifier 34 for conventionally detecting audio level and converting the detected audio level into a corresponding voltage value signal. Of course, as will be apparent to one of ordinary skill in the art, any other conventional means of detecting viewing audience response and converting it into a corresponding electrical signal may be employed in place of the microphone and audio amplifier arrangement 32-34 illustrated in FIG. 1. The voltage value signal output of the audio amplifier 34 is preferably selectively provided to a conventional sample and hold circuit, such as the type shown in greater detail in FIG. 5, for each of two sampled audience responses, assuming that the decision to be detected at the branching point is one of two possible branches corresponding to the movie display portion stored on one of the two movie media or reels associated with the movie projectors 22 and 24. Two such conventional sample and hold circuits 36 and 38, as opposed to the single one required in the presently preferred system 400 of FIG. 14, are illustrated in FIG. 1 with sample and hold circuit 36 corresponding to one sampled response and sample and hold circuit 38 corresponding to the other sampled response associated with a given branching point. The respective outputs of the sample and hold circuits 36 and 38 are preferably provided to a conventional voltage comparator 40 which compares the relative voltage values of the sampled viewing audience responses associated with a given branching point and provides an indication of the greater of the sampled values to the output circuit 42 which, in turn, provides a changeover signal via path 30° the changeover shutter system 26 preferably if the voltage comparison by comparator 40 indicates a higher signal value for the projector 22 or 24 other than the one which is then presenting the movie presentation.

Figure 2:
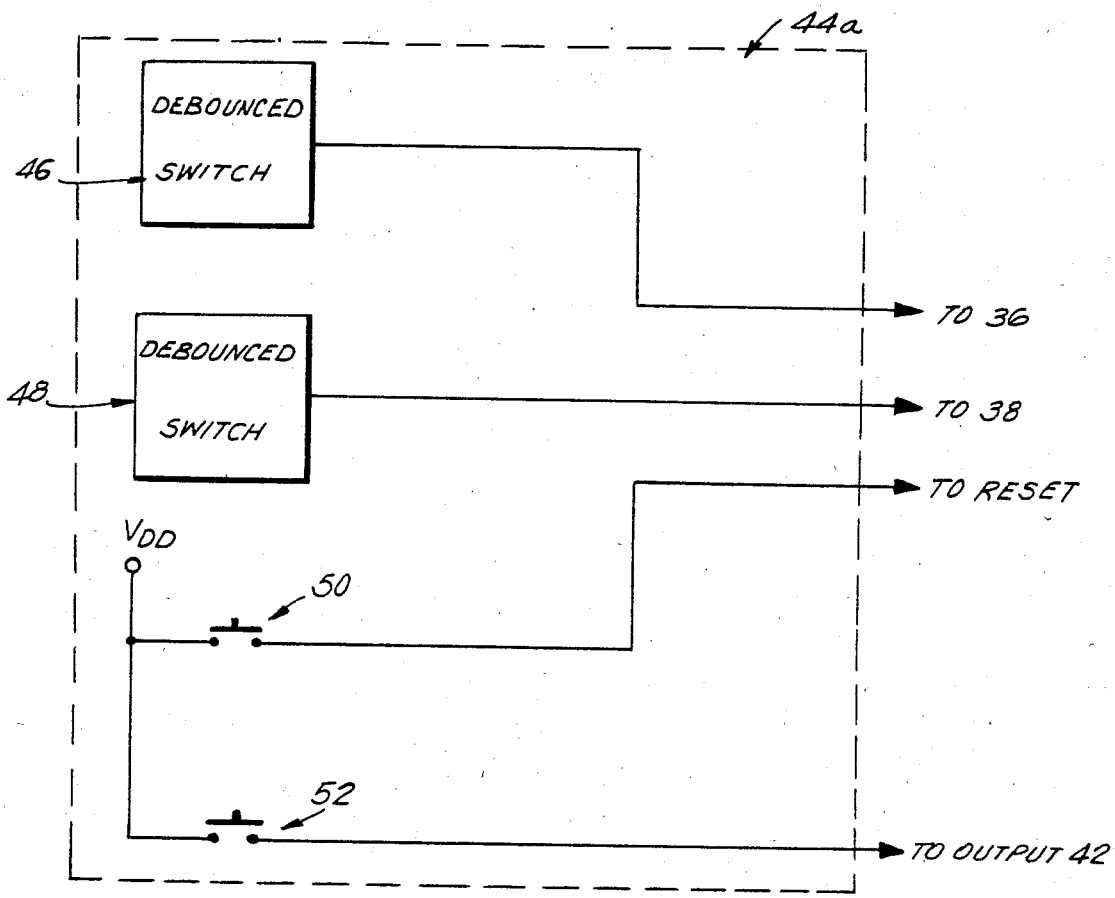
FIG. 2 is a functional block diagram, partially in schematic, of the control unit portion of FIG. 1 for a manual control embodiment of the system of FIG. 1.
Figure 3:
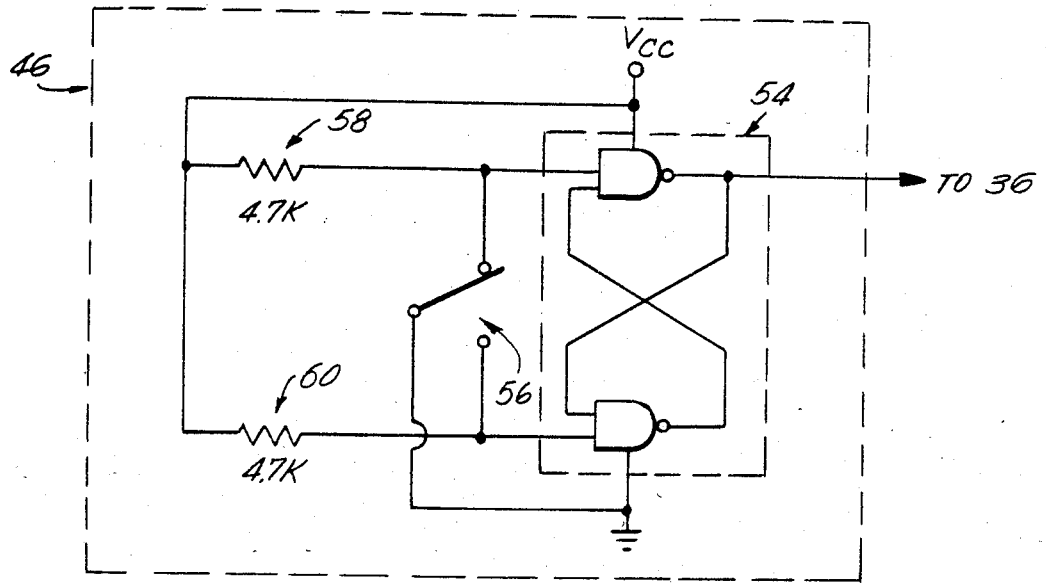
FIG. 3 is a schematic diagram of a typical debounced switch portion of the embodiment of FIG. 2.

As shown and preferred in FIG. 1, the sampling by the sample and hold circuits 36 and 38 and the provision of the changeover signal via path 30 by output circuit 42 is all preferably controlled by a control unit 44 to be described in greater detail hereinafter with reference to FIGS. 2 through 4. FIGS. 2 and 3 correspond to a manual version of the control unit 44 in which the projectionist controls the sampling times and changeover times in response to cues and FIG. 4 corresponds to an automatic version of the control unit 44 in which the sampling times and provision of the changeover signal are automatically provided in response to the detection of stored tones on the movie media being projected. For purposes of clarity, the manual version of the control unit 44 shall be referred to by reference numeral 44a and the automatic version of the control unit 44 shall be referred to by reference numeral 44b.

As is shown and preferred in FIGS. 2 and 3, the manual version 44a of the control unit 44, preferably comprises a pair of conventional debounced switches 46 and 48, which are shown in greater detail in FIG. 3, and a pair of conventional normally open momentary contact switches 50 and 52. As referred to above, and as will be described in greater detail hereinafter, in connection with manual control unit 44a, the various phases of operation of the viewing audience response analyzer 28 are determined by the projectionist preferably in response to visual or audible cues located on the movie media. Thus, debounced switch 46 enables sample and hold circuit 36 and debounced switch 48 enables sample and hold circuit 38 when the respective switch is activated. Similarly, momentary contact switch 52 enables operation of the output circuit 42 when activated and monmentary contact switch 50 enables reset of the sample and hold circuits 36 or 38 when activated. As shown and preferred in FIG. 3, the conventional debounced switches 46 and 48 comprise a conventional NAND gating circuit 54 such as a 7400 quad NAND, with half of the quad NAND being shown in FIG. 3, a single-pole-double-throw switch 56, and a pair of resistors such as the illustrated 4.7 Kilohm resistors 58 and 60. By way of example debounced switch 46 is illustrated in FIG. 3 although the same circuit also corresponds to debounced switch 48.

Figure 5:
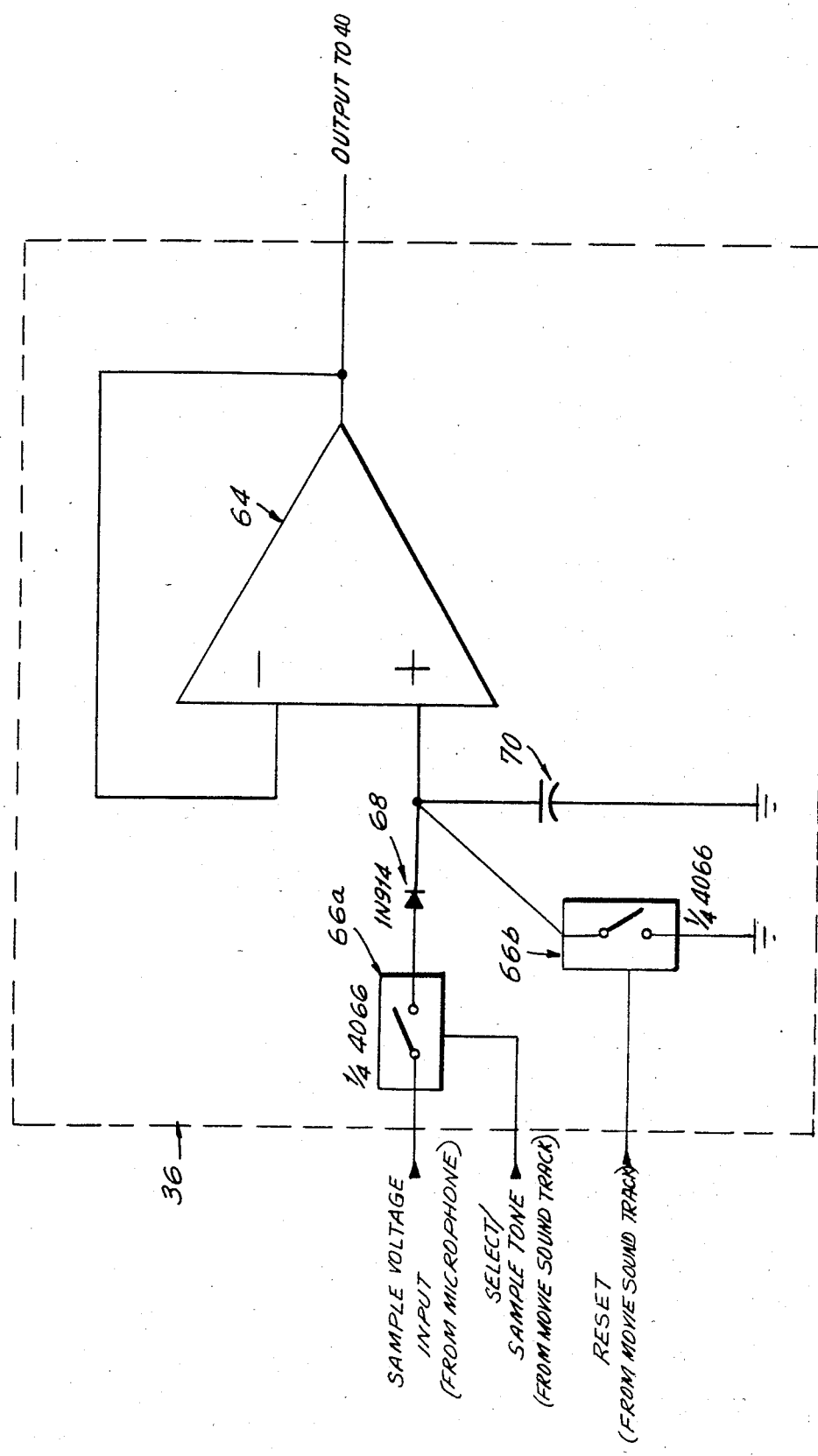
FIG. 5 is a schematic diagram of a typical sample and hold circuit portion of the embodiment of FIG. 1.

With respect to each of the conventional sample and hold circuits 36 and 38, a typical one of the sample and hold circuits 36 is illustrated in FIG. 5. Thus, the sample and hold circuit 36, by way of example, preferably includes a conventional high impedance operational amplifier 64, a conventional bilateral switching arrangement 66, such as one comprising half of a 4066 quad bilateral switch for sample and hold circuit 36, with one-quarter of the quad bilateral switch 66, switch 66a, being associated with the input to the sample and hold circuit 36 and with another quarter of the quad bilateral switch 66, namely switch 66b, being associated with the reset input to the sample and hold circuit 36. As shown and preferred in FIG. 5, a conventional diode 68, such as a 1N914 diode, is disposed between switch 66a and the input to operational amplifier 64 and a storage capacitor 70 is conventionally connected in parallel with switch 66b. As further shown and preferred in FIG. 5, the select input to the sample and hold circuit 36 is associated with switch 66a.

As will be described in greater detail hereinafter, with respect to the manual version control unit 44a illustrated in FIGS. 2 and 3, the projectionist preferably has four buttons, namely switches 46, 48, 50 and 52, for deciding which operation to enable at any given time. Switches 46 and 48 are preferably held down for as long as it is desired to have the respective sample and hold circuit 36 or 38 scanning the input. The output switch 52 enables a conventional relay or solenoid (not shown) located in the output circuit 42 depending on the magnitudes of the two stored voltages which are being compared by comparator 40 with the relay being enabled so as to provide a changeover signal when the sample voltage corresponding to the projector 22 or 24 then not projecting the movie exceeds that of the projector then projecting the movie presentation occuring previous to the branching point. The reset switch 50 preferably clears the stored voltages from the sample and hold circuits 36 and 38 so that both circuits 36 and 38 may return to zero and be ready for the sampling of another viewing audience decision.

Figure 4:
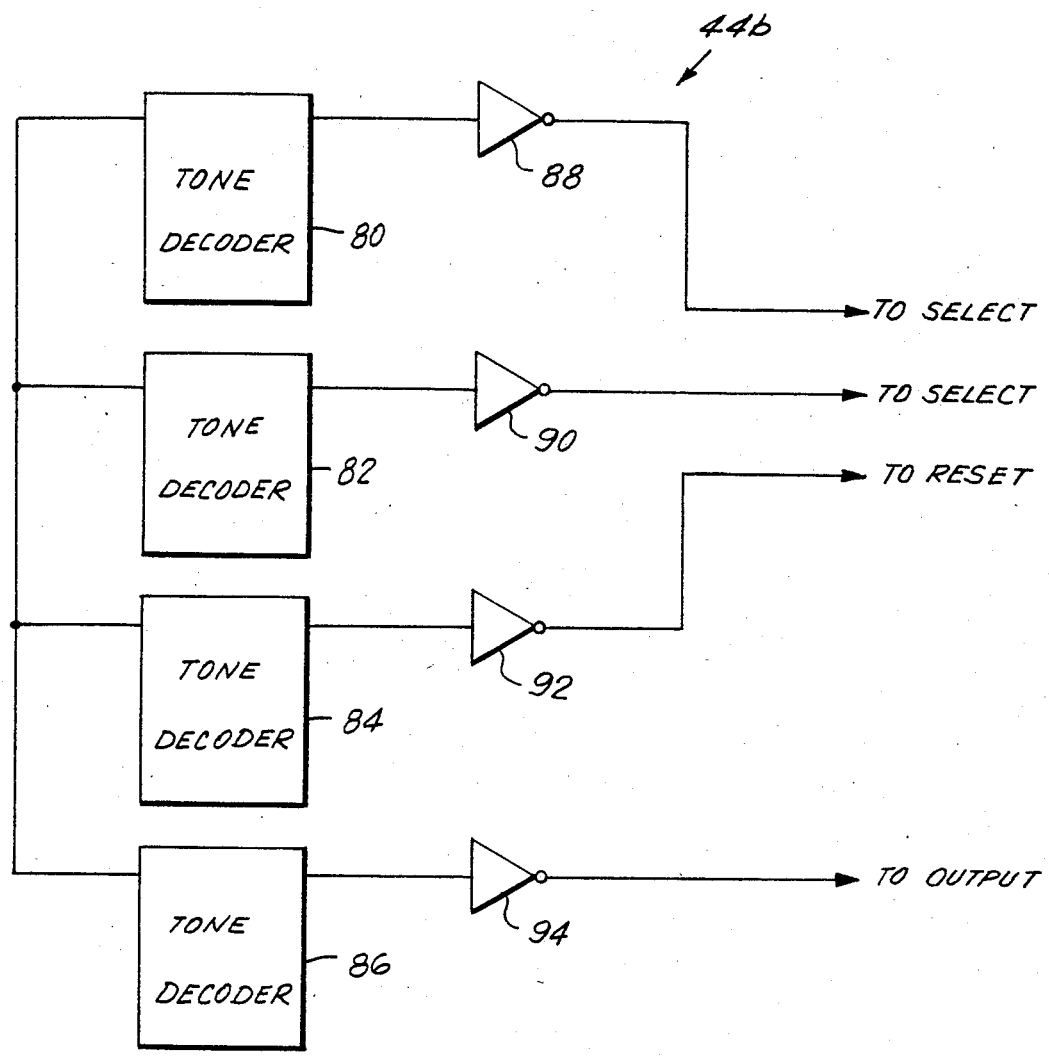
FIG. 4 is a functional block diagram, partially in schematic, of the automatic control unit portion embodiment of system of FIG. 1.

Referring now to FIG. 4, the automatic version 44b of the control unit 44 is illustrated in greater detail. As shown and preferred in FIG. 4 the aforementioned switches 46, 48, 50 and 52 of the manual version 44a are replaced by conventional tone decoders 80, 82, 84 and 86, such as conventional LM567 tone decoders, whose outputs are each provided via conventional inverters 88, 90, 92 and 94, such as one-sixth of a conventional SN 7404 TTL hex inverter. The associated balance of the circuitry for tuning the decoders 80, 82, 84 and 86 is conventional and is omitted for purposes of clarity. Thus, as will be described in greater detail hereinafter with respect to the automatic version 44b of the control unit 44, the various sampling and output commands are preferably decoded from inaudible tones placed on the sound track (or, if desired, be audible tones on an independent "2nd" sound track, of the movie media such as diagrammatically illustrated in FIG. 7, with each command preferably being assigned a different inaudible frequency. Thus, while the movie presentation is being displayed, the frequencies of the various inaudible tones are decoded causing the appropriate tone decoder 80, 82, 84 or 86 to go low, with the respective inverter 88, 90, 92 or 94 thereafter going high, so as to provide a control signal to the appropriate input of the sample and hold circuit 36 or 38 or the output circuit 42 of the analyzer 28.

Now referring to FIG. 6 the operation of the manual version 44a of the viewing audience responsive movie changeover system 20 shall be conceptually described. Thus, as shown in FIG. 6, this figure illustrates conceptually how a viewing audience decision may be achieved with the movie changeover system 20. For purposes of FIG. 6, it is assumed that the changeover from projector 22 to 24, by way of example, or associated movie media 22a to associated movie media 24a mounted on the projector 22 and 24, respectively, occurs four minutes before the end of the first reel or movie 22a, although, of course, this can vary according to the needs of each decision to be made in each movie. Generally these branching points are preferably spaced throughout the length of the respective movie reels so that multiple branching points and decisions can be seen by FIG. 6, the provision of a changeover signal and the resulting changeover from reel 22a to reel 24a, that is from projector 22 to projector 24, is conditional. Thus, if the sampling of the viewing audience prior to the branching decision point 100 in the above example indicates that the viewing audience prefers version 1 which is stored on reel 22a, then no changeover signal is provided and no changeover takes place at the branching point 100. Instead, the version on reel 22a is shown for a predetermined duration, such as four minutes, and a normal changeover would then take place at the normal changeover point 102 at the end of the reel 22a in conventional fashion. At this changeover point 102, reel 22a could be removed, rewound, and, as usual, a new reel could be threaded onto projector 22 in place of reel 22a. Alternatively, if the sampling had indicated that the viewing audience preferred version 2 which was stored on reel 24a, then the changeover signal would be provided and a changeover would take place, in a conventional manner, at the branching point 100 thereby providing a presentation of the version 2 portion stored on reel 24a for the aforementioned duration of 4 minutes. However, in this instance, there would be no need for a normal changeover at changeover point 102 since the changeover from reel 22a to reel 24a has already occurred. In such an instance, after the changeover at branching point 100, reel 22a would be removed, rewound, and, as usual, a new reel would be mounted on projector 22. Thus, summarizing the principal of operation of the system 20 of the present invention as generally illustrated in FIG. 6, the viewing audience is faced with a decision, being informed to audibly indicate their preference in response to a given cue and this audible level is sampled or detected at each of two points and the higher corresponding signal value used to enable the selection of version 1 or 2, with the actual version selected being shown to the audience. This process preferably repeats itself a number of times during the showing of the movie and several decision branching points, such as branching point 100, may be located before the end of a given reel so that the movie display presentation may shift from reel 22a to reel 24a and back to reel 22a without either of the reels being removed if such branching occurs substantially before the end of the respective reel 22a or 24a. Thus, it is possible to have many changeovers within a predetermined interval with both projectors 22, 24 running simultaneously, for example, such as to changeover ten times within this period.

With respect to FIG. 7, this corresponds to the automatic version 44b of the system 20 in which audible tones are placed on the respective movie sound tracks of reels 22a and 24a to enable the analyzer 28 when viewing audience responses are to be sampled, to inform the projectionist to start the other projector up to speed or, if desired, to automatically change over from one projector 22 or 24 to the other automatically based on the audience response being sampled, and to automatically reset the analyzer circuitry 28 so as to be ready for the next branching point decision. This arrangement makes it unnecessary for the projectionist to listen for end of reel alarms or watch for cue marks since all of these instructions are preferably stored on the sound track and are automatically implemented by the analyzer circuit 28 for the projectionist. If desired, conventional filter circuitry could be provided during the mode of operation referred to in FIG. 7 to filter out audience whistles or screams when audible of response is being sampled. The diagrammatic illustration of FIG. 7 illustrates how the cue tones appear on the movie sound track to accomplish automatic sampling and changeovers in my prior discribed systems. Thus, for example, tone A could cause automatic sampling of the first audience response, tone B could cause automatic sampling of the second audience response, tone C, located at the branching point 100, could automatically activate the changeover shutter 26, if required, and tone D could automatically reset the analyzer circuitry 28. If desired, an additional tone could also be included to inform the projectionist when to bring the other projector up to speed although the actual changeover would occur automatically. Each of these tones A, B, C and D would, preferably, be respectively associated with the tone decoders 80, 82, 84 and 86 and would be at a different frequency. Of course, this can be accomplished by any other means such as digitally.

Thus, the movie changeover system 20 enables specially developed decision tree full length movies to contain various branches or story paths. Various scenes, plots, endings or events could actually change on the screen based upon the desires and inputs of a given theater viewing audience sampled at various preselected branching points 100 throughout the movie. Thus, for example, if a character on the screen were teetering between falling into a pool of alligators and a pit of quicksand, the audience could be provided with a decision as to which does he fall into by voting for the outcome that the viewing audience desired, such as by cheering first for version 1 and then cheering for choice or version 2. For example, if choice or version 1 resulted in a higher signal value response then the movie would continue with the character falling into the alligator pool whereas if choice or version 2 resulted in a higher signal value response then the movie would continue with the character battling out of quicksand. The actual changeover, if required, would occur directly at a scene or camera angle change, to make the change undetectable to the viewing audience. Another possibility, for example, would be for the audience to act as a jury with the outcome of the movie depending on how the audience voted as a jury. Moreover, as will be described in greater detail hereinafter, the system 20 may be used to enable the ending of the movie to be automatically selected based upon the previous decisions of the audience which would indicate an audience preferential trend. Moreover, if desired, the audience decisions can be shown immediately or stored in memory for later viewing in the movie. Since the system 20 is responsive to a given viewing audience preference, a particular movie may result in many different overall movie presentations depending on the particular preferences of the viewing audience at a regard, however, the creation of the movie itself is more complex than for conventional movies since different scene versions or movie portions must be filmed consistent with decisions that are available to the movie audience and each version or portion must be timed against its parallel choice on the other reel, with these choices being coextensive in time from the branching point. In the decision tree movie presentation of the present invention, after the selected version or portion has been presented, the movie would return to its basic trunk or story line until the next branching point is reached.

Figure 8:
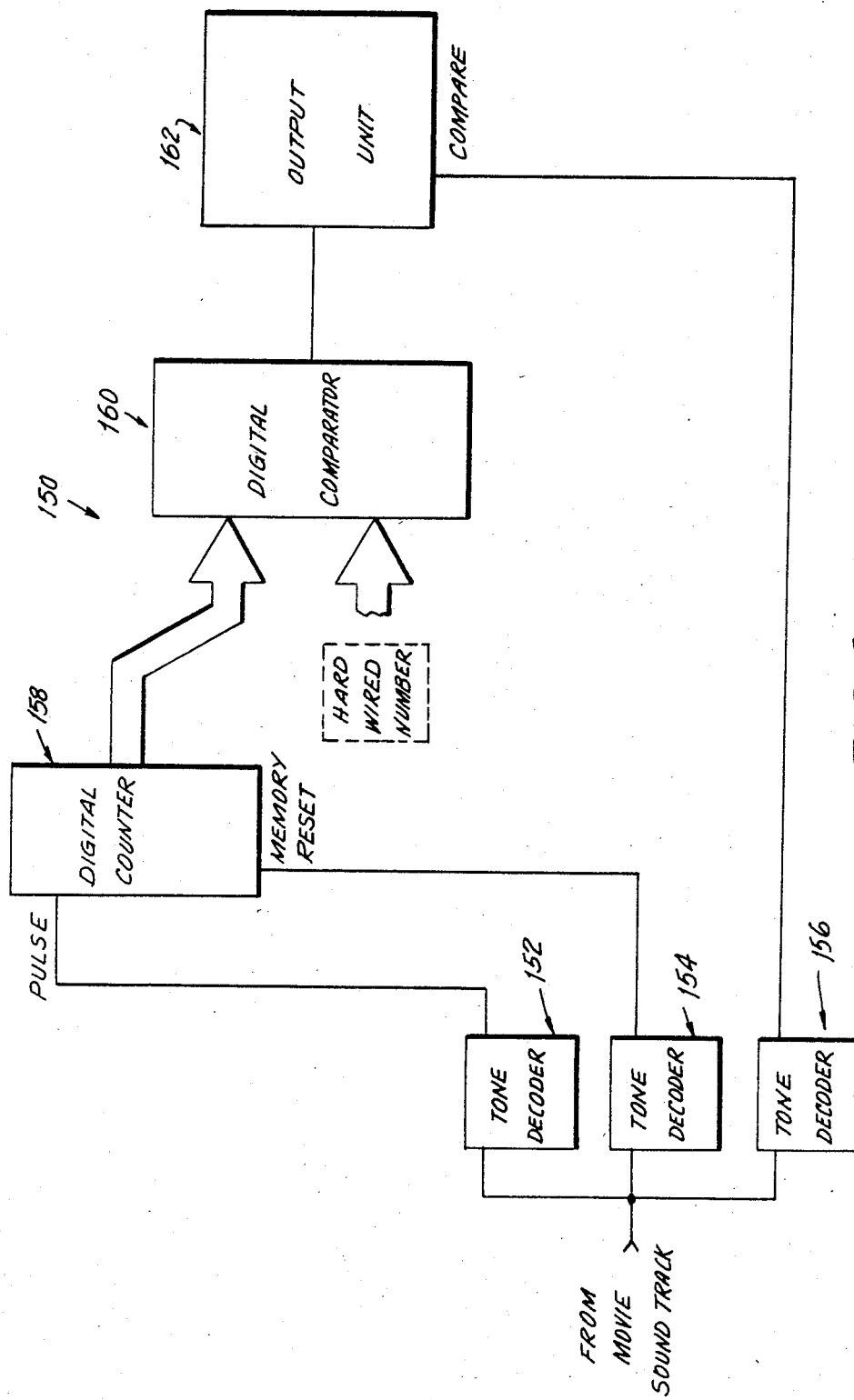
FIG. 8 is a block diagram of an alternative embodiment of the system of FIG. 1 for enabling storage of the trend of selection of the viewing audience.

With respect to the aforementioned ability of the system 20 to automatically choose an ending based on previously indicated audience preference determined from the previous sampled audience responses, a possible circuit for accomplishing this automatic ending selection is illustrated in FIG. 8. Thus, this ending selection or audience trend circuit, generally referred to by the reference numeral 150, preferably includes conventional tone decoders 152, 154 and 156 which are equivalent to decoder 82, by way of example, a conventional digital counter 158, a conventional digital comparator 160, and an output unit 162 which corresponds to output unit 42. Thus, in connection with the circuit 150 of FIG. 8, when the greater of the two sampled audio signal levels is determined and the solenoid or relay or electronic switch wired, for example, directly into the changeover mechanism, selects the proper reel 22a or 24a, the trend circuit 150, listens for a pulse signal preferably located on the movie sound track which is a tone on the sound track which causes the digital counter 158 to increment every time this pulse tone is detected. When it is detected, the memory register of the digital counter 158 increments by 1 for example. This occurs each time a changeover or selection takes place. It may be desirable to increment the counter by more than 1 in order to give weighted values to the trend, or to so code the audience selections in order to determine the particular decisions each audience made by the accumulated number in the memory register. The trend circuit 150 also "listens" for two other tones. One of them being the memory reset tone which tells circuit 150 to clear its digital counter 158 to 0. This tone is not the aforementioned reset tone associated with the response analyzer 28. Preferably, the memory reset tone for the counter 158 is provided to the trend circuit 150 before any pulse signals are sent so as to insure that the counter 158 is clear at start-up. The remaining tone, associated with tone decoder 156, is the compare signal which causes the trend circuit 150 to compare the number stored in its register or digital counter 158 with a hard wired number stored in the digital comparator 160 to determine if there is a match, or, for example it could take the majority of the two versions or choices. If the number present in the digital counter 158 or memory register is greater than the stored hard wired number in digital comparator 160, then the output unit 162 preferably operates a solenoid or relay to insure that the reel 22a or 24a which contains the movie ending associated with the audience trend is displayed. The hard wired number is preferably correllated to the content of the movie so that if a predetermined number of changes occurs based on the script of the movie, it is indicative that the viewing audience has a certain trend or preferential characteristic, such as by associating that number with violence, for example. If that number is not reached, that is if a sufficient number of audience selectible changeovers do not occur, then the movie would be scripted to indicate that the preferential characteristic of the audience is of a different type, such as non-violent in the above example. Thus, in accordance with the system 20 of the present invention, a real time decision tree movie presentation having a variable movie display content throughout the movie dependent on sample viewing audience response may be provided.

Figure 9:
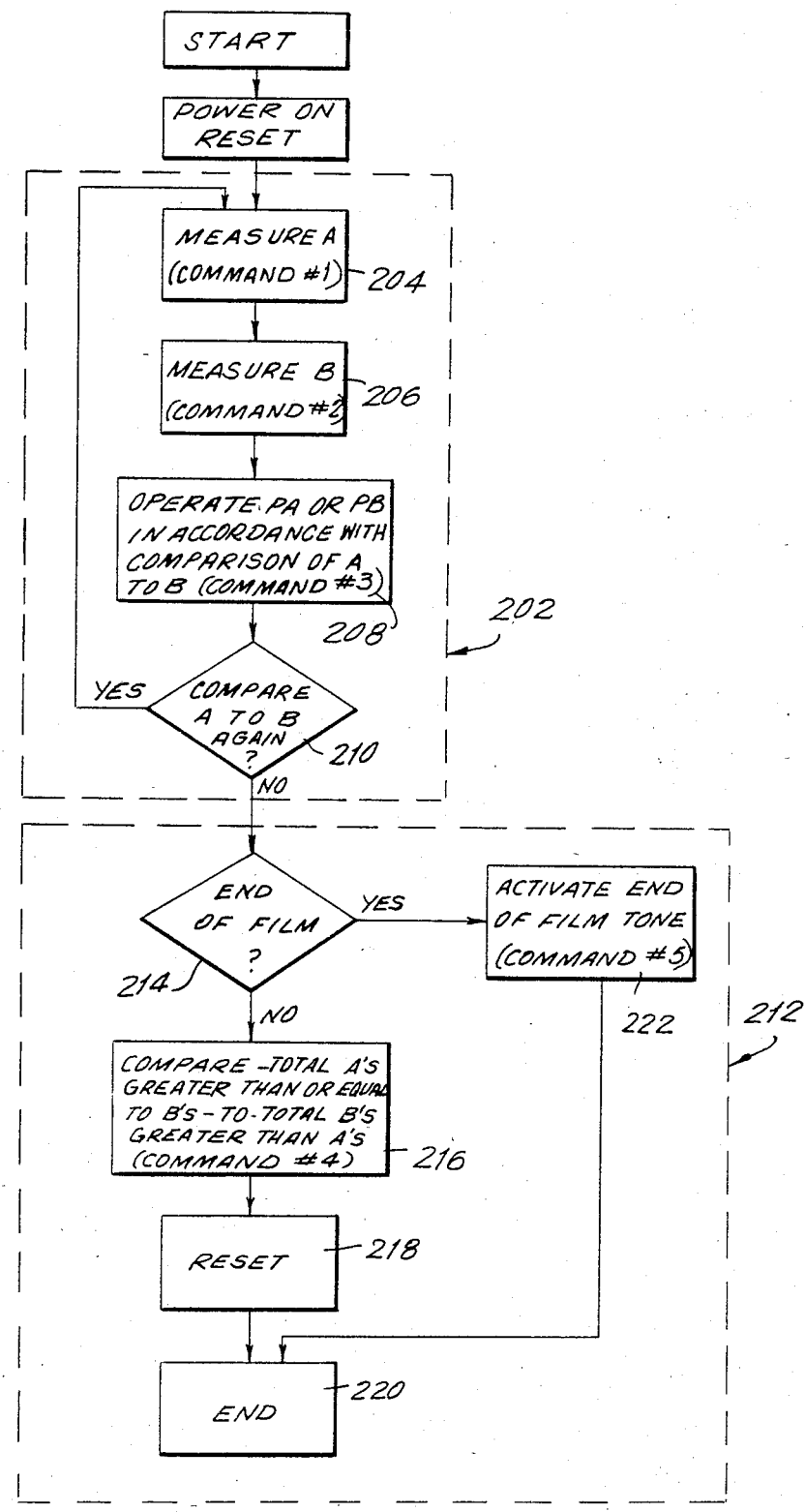
FIG. 9 is a system logic flow diagram of the command function operation of the changeover system described in said U.S. patent application Ser. No. 371,415.

Referring now to FIGS. 9-13, the improved version 200 of the movie changeover system 20 of the invention described in said U.S. patent application Ser. No. 371,415 now abandoned, shall now be described. As will be described in greater detail hereinafter, the tones referred to above with reference to FIG. 7 are, in reality, command signals which are associated with the command functions to be performed by the movie changeover system 20 of FIG. 1. These command signals may preferably be, by way of example, four tones of different frequency coded to indicate six different command functions, or burst signals where a unique number of bursts corresponds to a particular command function. In either approach, a command enable signal is preferably provided for enabling the system 200 to accept the coded information. For example, when four tones are employed, three of the four tones can be used to define the various command functions while the fourth tone can be the command enable signal, whereas in the instance when burst signals are employed, the last burst in the burst train can preferably be of a different frequency and serve as the command enable signal. Of course, other types of signals or indicators can be employed to define the command functions without departing from the spirit and scope of the present invention, such as employing one frequency coded in binary bursts or digital pulses, audible or inaudible, or using metallic adhesive strips on the film to close contact points which could be installed on the projectors. Moreover, the coding of these command signals can be disposed anywhere on the film if desired, such as on the film itself or the optical sound track of the film, or, as previously mentioned, can be timed, instead, into the circuit by hard wiring as opposed to being stored on the film. As was described above with respect to the system 20 of FIGS. 1-8, and as is also true with respect to system 200 of FIGS. 9-13, the command signals are preferably decoded by the system 200 which then performs the designated command function ultimately resulting in changeover, where indicated between the film media associated with projectors 22, 24, referred to as PA and PB respectively, dependent on the sampled viewing audience response at predetermined sampling times so as to provide a real time decision tree movie presentation having a variable movie display content throughout the movie. By way of example, the following Table 1 illustrates a preferred command coding arrangement for both a tone or coded frequency system and a burst signal or burst system.

command functions which repetitively occur during the presentation of the movie associated with the various branching points provided throughout the movie presentation, whereas area 212 and blocks 214, 216, 218, 220, 222, represent the various command functions associated with the aforementioned automatic selection of an ending to the movie based upon the previous decisions of the audience which would indicate a preferential trend, represented by blocks 214, 216, 218, 220 in FIG. 9, or the provision of a film end alarm, represented by blocks 214, 222, 220 in FIG. 9. The various command numbers in FIG. 9 correspond to the various coding and bursts are chosen to be near or within the natural passband of the recording and reproducing equipment utilized and at a frequency level that reduces the likelihood of being heard or perceived by theatre audience.

Figure 10:
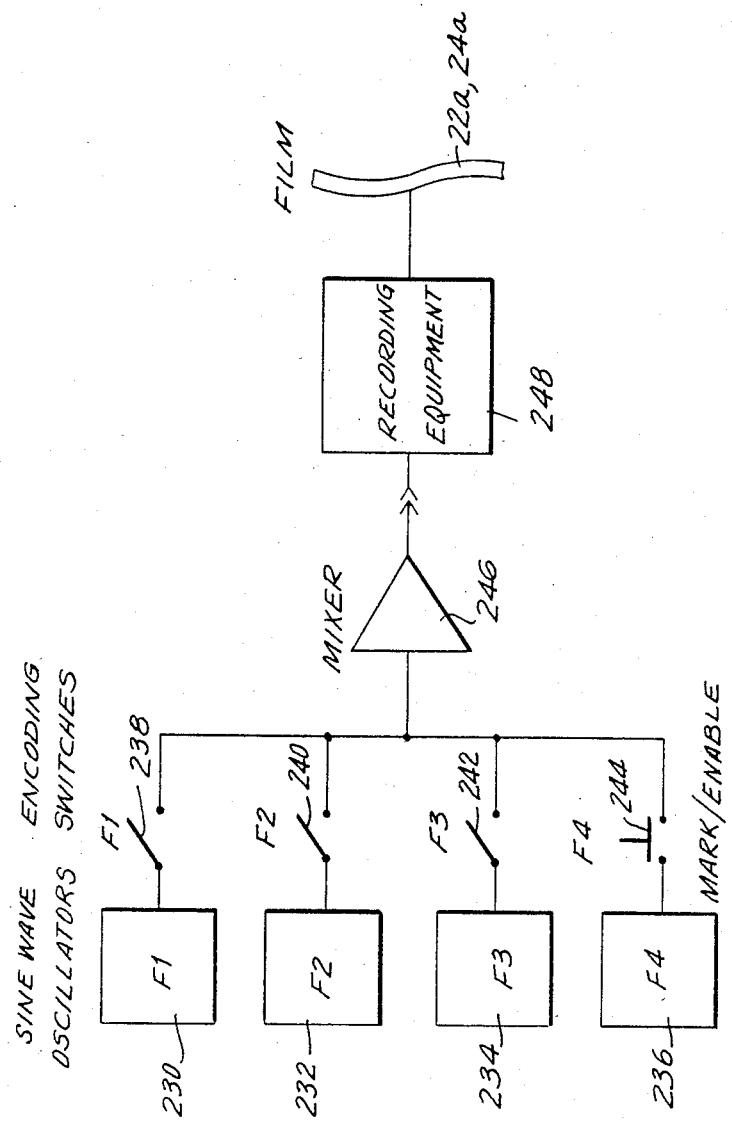
FIG. 10 is a functional block diagram of an encoding system for encoding movie film with predetermined command control signals in accordance with a frequency tone command signal embodiment of the concept of the changeover system illustrated in FIG. 9.
Figure 11:
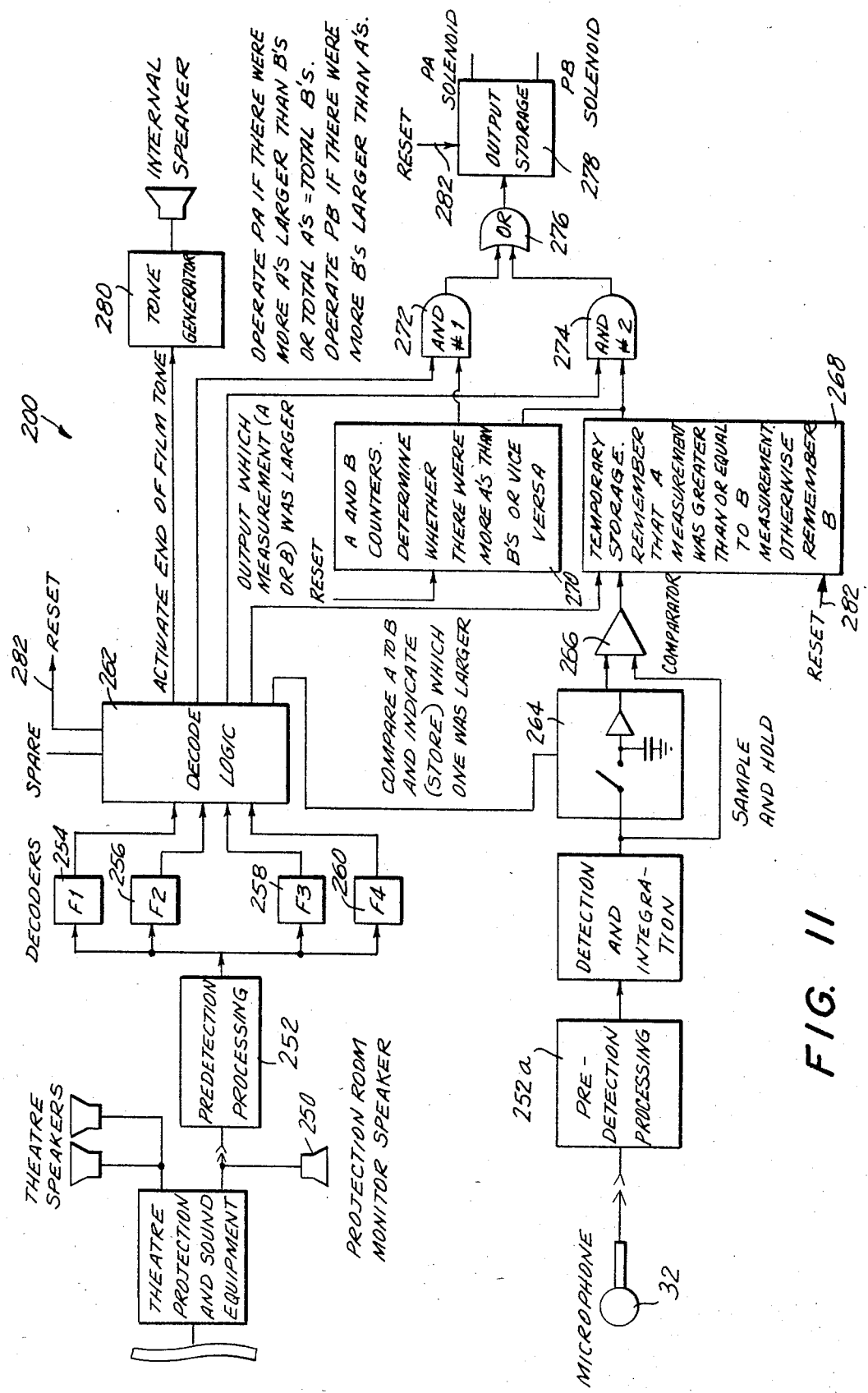
FIG. 11 is a functional block diagram, partially in schematic, similar to FIG. 1, of the frequency tone embodiment of the movie changeover system of the present invention in accordance with FIGS. 9 and 10.

Referring now to FIGS. 10 and 11, these figures relate to the aforementioned tone or frequency coded movie changeover system 200, with FIG. 10 illustrating a method and system for recording the coded tones or command signals referred to above in Table 1 on the film media 22a or 24a, and with FIG. 11 illustrating the movie changeover system 200 which is capable of providing the preferred variable movie display presentation using the prerecorded film media 22a and 24a. The recording system or method illustrated in FIG. 10, by way of example assumes that only four tones are employed with tones F1, F2, F3 being used to define the various command functions, such as illustrated in Table 1, and with tone F4 being used to provide the command enable signal. The varous tones F1, F2, F3, F4 may be provided from conventional sine wave oscillators 230, 232, 234, 236, each at a different frequency, which are switch selectable via conventional switches 238, 240, 242, 244 at the option of the operator during prepara-

TABLE 1

| CODED FREQUENCY SYSTEM | | | | BURST SYSTEM Number of | COMMAND | MEASURING/FUNCTION |
| --- | --- | --- | --- | --- | --- | --- |
| F4 | F3 | F2 | F1 | Bursts | NUMBER | Command |
| On | Off | Off | Off | 0 | 0 | Not used. |
| On | Off | Off | On | 1 | 1 | Measure audience/noise level during interval A. |
| On | Off | On | Off | 2 | 2 | Measure audience/noise level during interval B. Compare A to B to determine which level was higher and remember which of the two was larger. |
| On | Off | On | On | 3 | 3 | Switch to projector PA if A level was larger or equal to B level. If B level was larger than A level, switch to PB. |
| On | On | Off | Off | 4 | 4 | Switch to projector PA if there were more or the same number of A levels larger than B levels. Switch to PB if the reverse was true. |
| On | On | Off | On | 5 | 5 | Sound the film end alarm. |
| On | On | On | Off | 6 | 6 | Reset all memories and start again with the PA selected. |

FIG. 9 illustrates a typical command or logic flow diagram for the system 200 based, by way of example on the Preferred command coding arrangement illustrated above in TABLE 1. As illustrated in FIG. 9, area 202 and blocks 204, 206, 208, 210, represent the various tion of the film media 22a, 24a, to provide a command signal to be recorded on the film media 22a or 24a via a conventional mixer 246 and recorder 248. The command enable or mark frequency F4 is preferably activated by the push button 244 after the various command signal frequencies F1, F2, F3 are set. As shown and preferred in FIG. 11, the frequency coded film media 22a and 24a may then be employed in the movie changeover system 200 to provide the aforementioned real time decision tree movie presentation. Except for the apparent differences illustrated in FIG. 11, system 200 is preferably similar to system 20. Thus, the basic function of the system 200 is to measure audience/noise level, make a decision based on these levels and operate the pair of projectors 22 or PA and 24 or PB on command and as a function of these measured levels. The audience levels are preferably picked up by a conventional or wireless microphone 32 preferably located inside the theatre room. The coded frequency tones recorded on the various film media 22a or 24a are preferably received by a conventional monitor speaker 250 preferably located in the projection room. The command signals, which may preferably be recorded on the film media 22a, 24a sound tracks, are preferably picked up at the monitor speaker 250 and conventionally amplified and filtered in a conventional type of predetermined processing circuit 252. Preferably, signals above approximately 60 Hz are rejected to reduce interference from program material. The actual coded frequency tones are detected by conventional tone decoders 254, 256, 258, 260, one for each frequency F1–F4, respectively. The output of the tone decoders 254–260, inclusive, are then preferably fed to decode logic 262, such as a conventional BCD-to-decimal decoder, whose output is the command number, such as illustrated above in Table 1. The command numbers are preferably acted upon after the command enable frequency F4 is detected. Using the above example of Table 1, at the beginning of Command #1, a conventional sample-and-hold switch 264 is closed and held closed for a predetermined period, such as seven seconds. At the end of this time, the switch 264 is opened and the associated capacitor is when charged to a value proportional to the audience noise level as processed by the conventional predetection processing circuits 252, 252a. The next command would then preferably be Command #2 which is to enable measurement of audience level B. A predetermined period, such as seven seconds after Command #2 is detected, the output of a conventional comparator 266 is sampled and the results of the comparison (A level vs. B level) is then preferably stored in a conventional temporary storage 26b as well as in a pair of conventional A and B counters 270 which preferably continuously output a signal to indicate whether the total number of A levels are greater than or equal to the total number of B levels. Logically, if the total number of A levels are not greater than or equal to the total number of B levels, then that indicates that there were more B levels greater than A levels. A gating circuit 272, 274, 276 is preferably located between the output storage 278 and the counters 270 and temporary storage 268. Command #3 is preferably used via gates 274, 276 to gate the logic decision resulting from the comparision of levels A and B to the output storage 278. Preferably, the command to operate projector 22 or PA or projector 24 or PB is given when command #3 is detected. Similarly, command #4, is preferably used, via gates 272, 276, to gate the logic results of comparing all level A's greater than or equal to all level B's to the output storage 278, with this comparison resulting in the appropriate command function to the projectors 22 or PA and 24 or PB to select the ending movie presentation based on the audience preferential trend. Command #5, as indicated above in Table 1, preferably activates a tone via tone generator 280, to indicate the end of the film. Lastly, command #6, as also indicated above in Table 1, is preferably used to reset, via paths 282, all storage and sets the output storage 278 to operate projector 22 or PA.

Figure 12:
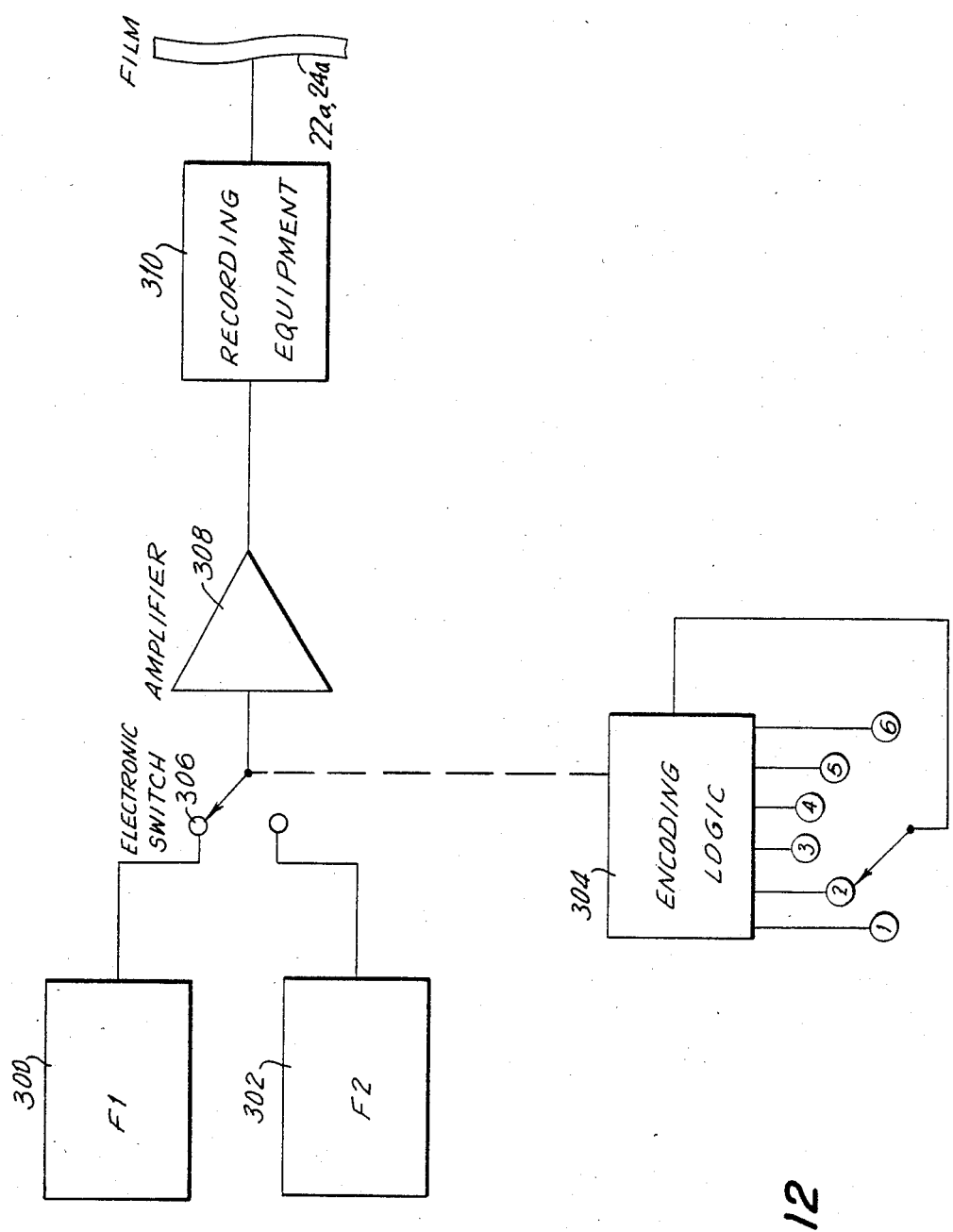
FIG. 12 is a functional block diagram of an encoding system for encoding movie film with predetermined command control signals in accordance with a burst train command signal embodiment of the concept of the changeover system of the present invention illustrated in FIG. 9.

Referring now to FIGS. 12 and 13, these figures relate to the aforementioned burst coded movie changeover system, generally referred to by the reference numeral 200a, with FIG. 12 illustrating a method and system for recording the coded tone bursts or command signals referred to above in Table 1 on the film media 22a or 24a, and with FIG. 13 illustrating the movie changeover system 200a which is capable of providing the preferred variable movie display presentation using the prerecorded film media 22a and 24a. The recording system illustrated by way of example in FIG. 12 assumes that only two different frequencies F1 and F2 are employed. Both these frequencies F1 and F2 may be conventionally provided by conventional signal generators 300 and 302, selected via conventional encoding logic 304 which conventionally controls a conventional electronic switch 306. In recording the coded burst train, frequency F1 is gated to provide the desired command signal to be recorded on the film media 22a or 24a via a conventional amplifier 308 and a conventional recorder 310 followed by selection of frequency F2 by switch 306 after the coded burst train to provide the command enable signal which is then recorded on the film media 22a or 24a. With respect to FIG. 13, the circuitry of movie changeover system 200a is preferably identical to that illustrated in FIG. 11 for system 200 with the exception that only two frequencies F1 and F2 are employed as opposed to four and that the desired command function is detected by counting the F1 bursts to provide a total count representative of the command function as opposed to the detection method employed in connection with the system 200 of FIGS. 10 and 11. Thus, the conventional decode logic 262 of FIG. 11 is replaced in FIG. 13 by a conventional decimal counter and decode logic circuit 320 and the four conventional decoders 254, 256, 258, 260 in FIG. 11 are replaced by two conventional decoders 322 and 324. Otherwise, preferably the processing and detection of audience response level and the provision of the appropriate command functions is identical in both systems 200 and 200a and identical reference numerals are employed. Thus as previously stated, the system 200 of FIGS. 10 and 11 uses four tones which are coded to indicate the six commands #1–#6 identified above in Table 1, whereas the system 200a of FIGS. 12 and 13 uses a burst technique in which the number of bursts indicates the six commands #1–#6 identified above in Table 1. In either instance, the various prerecorded command signals are used to control the sampling times of audience level response and other command functions to enable the provision of the real-time variable movie display presentation dependent on the audience response at preselected decision times in the movie.

Referring now to FIG. 14, the presently preferred improved system of the present invention, generally referred to by the reference numeral 400, shall now be described. The presently preferred system 400 differs from the systems 20 and 200 previously described above in several important areas; namely, the ability under appropriate circumstances to concurrently sample audience responses, using a single sample and hold and storage register in lieu of the two sample and hold and separate sampling requirements of the aforementioned system 20; the improved ability to vote against a standard which has been stored either in a storage register or encoded on to the film or derived from a previous vote of the audience so that the standards can be tailored to a particular audience; and the improved ability to select an ending based on audience response. There are also other differences which will become readily apparent to one of ordinary skill in the art. As shown and preferred in FIG. 14, the system 400 still employs microphone input 32 for sampling the audience response. However, as will be described in greater detail hereinafter, a single sample and hold circuit 402 is employed. The system 400 also employs an electronic switching network 404 which steers and selects the input to the voltage comparator 440 in response to control signals from the control unit 444 which develops the signals to steer the comparator inputs from tones on the film track essentially in the manner previously described with respect to systems 20 and 200. In its most basic form, the presently preferred audience response system 400 compares levels between two consecutive audience response periods. Each time period is approximately, by way of example, seven seconds. Tones on the film, as was previously described, are decoded in the control unit 444 and force the sample and hold circuit 402 to track the audience response level as picked up by the microphone 32 and processed by the signal processing network 452 in the manner previously described. After seven seconds in the above example, the sample and hold circuit 402 preferably holds the average value of the previous seven seconds of audience response. When the second voting period is initiated, another timer is started and, after the aforementioned exemplary seven seconds, the comparator 440 output is transferred to temporary storage 478, with the register 478 state indicating which of the average vote levels was greater. When a changeover is desired, another sequence of tone pulses is decoded and the data in the temporary register 478 is transferred to the output 442 causing the changeover, assuming that the previous comparison requires that a change of projector be made. Except for the differences described above, the presently preferred system 400 is essentially the same as that previously described with reference to systems 20 and 200. However, as also shown and preferred in FIG. 14, the two votes are preferably also separately stored in counters 406 and 408 respectively at the same time that they are stored in the temporary storage register 478. As will be described in greater detail hereinafter, a film ending can then be selected by comparing the total votes for the first choice accumulated, by way of example, in counter 406, with the total votes accumulated for the second choice, by way of example, in counter 408, in a comparator 410, and thereafter transferring the results of this comparison to the output 442 via gate 412 when an appropriate command is decoded from the tones on the film track.

As was previously mentioned, the presently preferred system 400 differs from systems 20 and 200 in its ability to select a script path based on a concurrent level and frequency analysis of an audience response. In this regard, in this mode, switch 404 is moved to position 2 indicated by the dotted lines in FIG. 14 when the appropriate tones encoded on the film track are decoded by the control circuit 444 to provide the control signal to switch 404 which accomplishes this change of position. In this position of switch 404, the inputs to the comparator 440 are the outputs of two conventional frequency discriminator circuits 416 and 418 which simultaneously or concurrently accomplish signal processing of the detected audience response from microphone 32 on the basis of frequency separation. Thus, signal processing circuit 416 preferably comprises a conventional low pass filter in what may be termed the "boo" path and signal processing circuit 418 comprises a conventional high pass filter in what may be termed the "yea" or whistle path. Filtering and averaging of the detected audience response via microphone 32 is preferably accomplished in real time during the same voting period for both responses with the largest output of the two processing paths 415 and 418 driving the changeover mechanism as a result of provision to the comparator 440 which detects the largest output and provision of this information to the temporary storage register 478 and therefrom to the output circuit 442. Thus, the primary difference between this portion of the system 400 and system 20 and 200 resides in the simultaneous sampling of audience responses which can be separated out by frequency so that separate sampling times are not required. A third position, position three, of switch 404 is also illustrated in FIG. 14 in dotted lines. In this third position of switch 404, the output of the signal processing circuit 452, which merely measures signal level, is compared to a voltage level reference which can either be a stored value in a reference storage or reference voltage device 420 and selected via tone commands, or can be stored on the film itself and loaded into the reference storage device 420 under control of the control circuit 444 when needed. The comparison with the reference voltage is then accomplished via comparator 440 in the same manner as was previously described with respect to a comparison between two audience responses. In addition, if desired, the responses from each film showing in the theatre can be stored as can the total responses recorded by a given audience in a permanent record maintained, such as in a permanent storage register 422. If desired, a changeover to projector A from projector B or to projector B from projector A can be forced by the proper tone command on the film, with the change command placed on the sound track when it is recorded and, therefore, permitting the script writer to force a scene independent of previous audience responses.

As was previously mentioned, another important distinction in the presently preferred system 400 of the present invention is its ability to select one of a series of endings where the audience response is used to select the ending. As will be described hereinafter, this ending selection process is accomplished in two stages; the first stage consisting of audience voting for endings and with the second stage consisting of the ending selection logic 424 looking for the ending chosen. During the first stage, and for the first ending vote, tones on the sound track cause the sample and hold circuit 402 to track an audience response. After the sample period, such as approximately seven seconds by way of example, another command stored on the film, causes the held sample to be compared to the current audience response. If the second audience response is greater than the first sampled audience response, then the second audience response is stored in the sample and hold 402. The logic and comparison circuits in the ending selection logic 424 select the larger response with this process continuing until all ending possibilities have been presented to the audience for sampling of their respective responses.

A pair of counters, also preferably located in the ending selection logic 424, are preferably used to keep track of the number of ending votes and the ending with the largest response. In the second stage, the ending selection logic 424 looks for the ending selected. Assuming that the audience response for the different ending possibilities were on projector A and the different endings were on projector B, and further assuming that a "look for ending" command was placed on the reel in projector A just prior to the time when the actual ending appears on reel B, if the ending about to pass on reel B is the ending selected, then the ending selection logic 424 will force a change to projector B. If the ending about to pass is not the ending selected, a changeover will not be made. This process will continue until the ending desired is about to pass through projector B at which time a changeover will be made.

The location of the selected ending is accomplished in the following fashion. Each time a vote for a particular ending is detected, a counter is incremented. If this vote is the largest of the previous votes, the count number will be stored in a second counter. During the second stage in which the ending chosen is being looked for, this second counter is decremented each time a "look for ending" command appears on the reel on projector A. When this counter hits zero the changeover to the desired ending is made. In this regard, multiple endings may be stored on reel B for example with reel A comprising a common channel of normal action taking place before or after the action of the various endings stored on reel B, with these scenes being timed so as to be capable of being merged with each other. For example, if the choices at the end of a movie are to let a criminal go free, go to jail, or hang, this can be merged with a common walking type of scene perhaps showing a close up of his feet walking which could commonly be employed to show him walking away free, or to show him walking in a jail cell or, in the instance of a hanging, to omit this walking scene altogether. Of course, an ending can be provided based on no audience response at all. In this regard, assume that there are five votes programmed and that the second, third and fourth votes are compared against the previous vote of the audience and assume that the fifth vote is compared to a reference, such as a stored ending reference 430, which is selected so that it is greater than ambient noise. In this instance, if all of the audience responses are less than the reference 430, the fifth ending would be selected, whereas if one of the responses is greater than the reference 430, the system 400 would changeover to show the ending selected by the audience. This feature can be accommodated by switching the input to the sample and hold 402 between audience responses and the reference 430 via electronic switch 414.

In addition, the preferred system 400 also has the ability to take a vote based on a mix of different audience response characteristics. This can be accomplished with the previously described system 400 with the exception that switch 404 is preferably arranged to steer the proper inputs to be compared such as level versus frequency content or frequency content versus a reference. Apart from the above described differences, the system 400 is essentially identical with that previously described with reference to FIGS. 1-13, and particularly with reference to FIGS. 9-13, and need not be described in any greater detail hereinafter.

Thus in accordance with the system of the present invention, a real time decision tree movie presentation having a variable movie display content throughout the movie dependent on sampled viewing audience response may be provided.

It is to be understood that the above described embodiments of the invention are merely illustrative of the principles thereof and that numerous modifications and embodiments of the invention may be derived within the spirit and scope thereof. Moreover as used throughout the specification and claims movie media is meant to include videotape and other conventional storage media capable of providing continuous movie type of pictorial presentations and, as such, the terms recording or filming are meant to generically refer to the storage of information on such media. Further, projectors are meant to generically refer to equipment that displays the information stored on the media and for film includes conventional, platter, and semi-automatic media handling equipment.

What is claimed is:

1. In a movie changeover system comprising a pair of movie projection devices each having an associated portion of a substantially continuous overall motion picture presentation therefrom, each of said movies media having stored thereon a projectable portion of said overall motion picture presentation content, and a real-time changeover means operatively associated with said pair of projection device for selectively projecting a movie display of solely said movies media projectable portions from one of said pair of projection devices in a real time continuous mass audience movies display presentation with the previous movie display portion in response to a changeover signal; the improvement comprising a decision tree movie presentation stored on said movie media, said stored overall motion picture presentation content including said projectable portions thereof comprising said decision tree movie presentation, said stored decision tree movie presentation comprising first and second different branching choice movie display presentation portions at a common decision tree movie display branching point, each of said first and second branching choice movie display presentation portions having a different movie display content commonly associated with the movie display portion content preceding said common decision tree movie display branching point, each of said coextensive first and second branching choice movie display presentation portions being stored on a different one of said associated movie media, said preceding movie display portion content comprising a sampling interval prior to said common decision tree movie display branching point for concurrently sampling mass audience response of preferential selection of said first and second branching choice movie display presentation portions; means for concurrently detecting and sampling an audible first and second one of said audience responses, said concurrent detection and sampling means comprising means for discriminating between said first and second concurrently sampled mass audience audible responses, each concurrently sampled mass audience audible response being associated with a different one of said first and second bracnhing choice movie display presentation portions for providing corresponding first and second mass audience response preferential signals respectively from said concurrently sampled mass audience response during said concurrent sampling interval, each of said mass audience response preferential signals having a relative signal value dependent on the associated mass audience response; and condition responsive means operatively connected to said concurrent detecting and sampling means for selectively providing said changeover signal to said changeover means substantially at said common decision tree movie display branching point directly in response to said detected relative signal values for enabling said selective projection of solely said movie media projectable portion corresponding to the previously sampled preferential first or second branching choice of the sampled mass audience based on said concurrently detected mass audience audible responses, said changeover means enabling said substantially continuous real time movie display presentation of solely the preferentially selected first or second branching choice movie display presentation portion substantially at said common decision tree movie display branching point; whereby a real time decision tree movie presentation having a variable movie display content dependent on a concurrent determination of a preferential mass audience response may be provided.

2. An audience responsive movie changeover system in accordance with claim 1 wherein said means for concurrently detecting and sampling said audience audible responses comprises microphone means and frequency discriminating means for detecting audio level and frequency of said concurrently sampled audience responses, said concurrently sampled audience responses being concurrently filtered and averaged over said sampling interval for separating said concurrently sampled first and second branching choices by frequency and detecting said audio level of said frequency separated choices for providing said preferential signal values, said relative preferential signal values being dependent on the detected audio level of said associated audience response.

3. An audience responsive movie changeover system in accordance with claim 2 wherein said frequency discriminating means comprises a low frequency filter means for detecting one of said concurrently sampled audience responses associated with one of said branching choices and a high frequency filter means for detecting the other of said concurrently sampled audience responses associated with the other of said branching choices.

4. An audience responsive movie changeover system in accordance with claim 3 wherein said means for concurrently detecting and sampling said audience responses further comprises a common comparator and sample and hold means operatively connected to said changeover signal providing means for sampling and holding a preferred one of said concurrently detected relative preferential signal values and providing said held value to said changeover signal providing means at a predetermined time relative to said common decision tree movie display branching point.

5. An audience responsive movie changeover system in accordance with claim 4 wherein said common comparator and sample and hold means comprises voltage comparator means operatively connected to a sample and hold means for comparing the relative voltage signal values of said concurrently detected audience response audio levels and for providing said changeover signal based on said comparison.

6. An audience responsive movie changeover system in accordance with claim 5 wherein said changeover signal providing means further comprises output means for providing said changeover signal only when the one of the pair of movie media containing the branching choice movie display presentation content associated with the detected higher relative signal value preferential audience response is different from the movie media providing the preceeding movie display presentation at said common decision tree branching point.

7. An audience responsive movie changeover system in accordance with claim 6 wherein said changeover means comprises relay means operatively connected to said output means for selectively enabling said movie display projection from one of said movie projection devices in response to said changeover signal.

8. An audience responsive movie changeover system in accordance with claim 7 wherein said movie media each comprise stored tones in said real-time sampling interval and said detecting and sampling means further comprise tone decoder and sampling control means for decoding said stored tones and initiating said sampling and said changeover signal provision in accordance with detection of predetermined ones of said decoded tones.

9. An audience responsive movie changeover system in accordance with claim 8 wherein said movie media each comprise a plurality of different ones of said pairs of branching choice movie display presentation portions and associated common decision tree movie display branching points spaced throughout said stored decision tree movie presentation.

10. An audience responsive movie changeover system in accordance with claim 2 wherein said means for concurrently detecting and sampling said audience responses further comprises a common comparator and sample and hold means operatively connected to said changeover signal providing means for sampling and holding a preferred one of said concurrently detected relative preferential signal values and providing said held value to said changeover signal providing means at a predetermined time relative to said common decision tree movie display branching point.

11. An audience responsive movie changeover system in accordance with claim 10 wherein said common comparator and sample and hold means comprises voltage comparator means operatively connected to a sample and hold means for comparing the relative voltage signal values of said concurrently detected audience response audio levels and for providing said changeover signal based on said comparison.

12. An audience responsive movie changeover system in accordance with claim 11 wherein said changeover signal providing means further comprises output means for providing said changeover signal only when the one of the pair of movie media containing the branching choice movie display presentation content associated with the detected higher relative signal value preferential audience response is different from the movie media providing the preceeding movie display presentation at said common decision tree branching point.

13. An audience responsive movie changeover system in accordance with claim 12 wherein said changeover means comprises relay means operatively connected to said output means for selectively enabling said movie display projection from one of said movie projection devices in response to said changeover signal.

14. An audience responsive movie changeover system in accordance with claim 1 wherein said movie media each comprise stored tones in said real-time sampling interval and said detecting and sampling means further comprise tone decoder and sampling control means for decoding said stored tones and initiating said sampling and said changeover signal provision in accordance with detection of predetermined ones of said decoded tones.

15. An audience responsive movie changeover system in accordance with claim 14 wherein said stored tones comprise a plurality of spaced apart tones, a different tone being associated with each of said two audience responses to be sampled and with said common decision tree branching point with which said changeover signal provision is associated.

16. An audience responsive movie changeover system in accordance with claim 1 wherein said movie media each comprise a plurality of different ones of said pairs of branching choice movie display presentation portions and associated common decision tree movie display branching points spaced throughout said stored decision tree movie presentation.

17. An audience responsive movie changeover system in accordance with claim 1 wherein said movie media each comprise stored coded command signals in said real time sampling interval and said detecting and sampling means further comprise command signal decoding and sampling control means for decoding said stored coded command signals and initiating said sampling and said changeover signal provision in accordance with detection of predetermined ones of said decoded command signals.

18. An audience responsive movie changeover system in accordance with claim 17 wherein said stored coded command signals comprise a plurality of unique command signals indicative of command control functions for initiating said sampling and said changeover signal provision in accordance with detection of predetermined unique ones of said decoded command signals, said sampling means and said changeover signal providing means being responsive to said unique command signals, said unique command signals being stored on said movie media.

19. An audience responsive movie changeover system in accordance with claim 17 wherein said unique command signals each comprise a combination of different unique tone frequencies corresponding to a different command function, said decoder means further comprising tone decoder and decoder logic means responsive to detection of said different unique tone frequencies for initiating a unique command function in said movie changeover system.

20. An audience responsive movie changeover system in accordance with claim 1 wherein said means for concurrently detecting and sampling said audience responses further comprises a common comparator and sample and hold means operatively connected to said changeover signal providing means for sampling and holding a preferred one of said concurrently detected relative preferential signal values and providing said held value to said changeover signal providing means at a predetermined time relative to said common decision tree movie display branching point.

21. An audience responsive movie changeover system in accordance with claim 20 wherein said common comparator and sample and hold means comprises voltage comparator means operatively connected to a sample and hold means for comparing the relative voltage signal values of said concurrently detected audience response audio levels and for providing said changeover signal based on said comparison.

22. An audience responsive movie changeover system in accordance with claim 1 wherein said system further comprises means for storing a standard signal value associated with one of said first and second branching choices and for comparing said concurrently sampled audience responses therewith for providing a changeover signal only when said preferential signal value associated with said other branching choice exceeds said stored standard signal value.

23. An audience responsive movie changeover system in accordance with claim 22 wherein said movie media comprises a stored coded command signal in said real time sampling interval, said detecting and sampling means further comprising command signal decoding and sampling control means for decoding said stored coded command signals and being operatively connected to said comparing means for initiating said comparison of said stored standard signal value with said concurrently sampled audience response.

24. An audience responsive movie changeover system in accordance with claim 23 wherein said standard signal value storage means further comprises said movie media, said control means further comprising means for initiating provision of said stored standard signal value from said movie media to said comparing means for enabling said comparison of said stored signal value with said concurrently sampled audience response.

25. An audience responsive movie changeover system in accordance with claim 24 wherein said stored different branching choice movie presentations further comprise a plurality of different selectable ending display content presentations for said overall motion picture presentation content, said system further comprising ending selection logic means, said detecting and sampling means being operatively connected to said ending selection logic means for providing a plurality of audience ending preferential responses to said ending selection logic means based on said sampling of audience responses of said ending display branching choices during an ending sampling interval, said ending selection logic means comprising means for detecting the most preferred ending display branching choice from said sampled audience response for providing an audience ending preferential signal based thereon, said changeover signal providing means further comprising output means operatively connected to said ending selection logic means for providing said changeover signal in response to said audience ending preferential signal.

26. An audience responsive movie changeover system in accordance with claim 25 wherein said ending selection logic means comprises counter means for incrementally storing a count as said audience ending preferential signal based on said deleting and sampling of said plurality of audience ending preferential responses, said counter storing the largest count detected, said counter means being incremented by detecting said preferential audience ending response associated with the most preferred ending, each of said stored ending display content presentations having an associated count value and an associated stored look for ending command signal, said counter means being decremented each time said look for ending command signal is detected until said stored count is zero, said ending selection logic means providing said audience ending preferential signal to said changeover signal providing means in response to said zero count of said counter means.

27. An audience responsive movie changeover system in accordance with claim 26 wherein said means for detecting and sampling said audience responses comprises microphone means for detecting audio level as said sampled audience ending preferential responses, said relative preferential response signal values being dependent on the detected audio level of said associated audience ending response.

28. An audience responsive movie changeover system in accordance with claim 27 wherein said system further comprises means for storing a standard signal value associated with one of said selectable ending display branching choices and for comparing said sampled audience ending preferential responses therewith for providing a changeover signal only when said preferential signal value associated with said sampled responses exceeds said stored signal value.

29. In a movie changeover system comprising a pair of movie projection devices each having an associated portion of a substantially continuous overall motion picture presentation therefrom, each of said movie media having stored thereon a projectable portion of said overall motion picture presentation content, and a real time changeover means operatively associated with said pair of projection devices for selectively projecting a movie display of solely one of said movie media projectable portions from one of said pair of projection devices in a real time continuous mass audience movie display presentation with the previous movie display portion in response to a changeover signal; the improvement comprising a decision tree movie presentation stored on said movie media, said stored overall motion picture presentation content including said projectable portions thereof comprising said decision tree movie presentation, said stored decision tree movie presentation comprising first and second different branching choice movie dispaly presentation portions at a common decision tree movie display branching point, each of said first and second branching choice movie display presentation portions having a different movie display content commonly associated with the display branching point and being substantially coextensive in movie display time from said common decision tree movie display branching point, each of said coextensive first and second banching choice movie display presentation portions being stored on a different one of said associated movie media, said preceding movie display portion content comprising a sampling interval prior to said common decision tree movie display branching point for sampling audience response of preferential selection of said first and second branching choice movie display presentation portions; means for detecting and sampling an audible first and second one of said mass audience responses, with each sampled mass audience audible response being associated with a different one of said first and second branching choice movie display presentation portions for providing corresponding first and second audience response preferential signals respectively therefrom during said sampling interval, each of said audience response preferential signals having a relative signal value dependent on the associated mass audience response; and condition responsive means operatively connected to said detecting and sampling means for selectively providing said changeover signal to said changeover means substantially at said common decision tree movie display branching point in response to said detected relative signal values for enabling said selective projection of solely said movie media projectable portion corresponding to the previously sampled preferential first or second branching choice of the sampled mass audience based on said detected mass audience audible responses, and changeover means enabling said substantially continuous real time movie display presentation of solely the preferentially selected first or second branching choice movie display presentation portion substantially at said common decision tree movie display branching point, whereby a real time decision tree movie presentation having a variable movie display content dependent on mass audience response may be provided, said means for detecting and sampling said mass audience audible responses comprising microphone means for detecting audio level as said sampled mass audience responses, said relative preferential signal values being dependent on the detected audio level of said associated mass audience response, said system further comprising means for storing a standard signal value associated with one of said first and second branching choices and for comparing said concurrently sampled mass audience responses therewith for enabling said changeover signal only when said preferential signal value associated with said other branching choice exceeds said stored standard signal value.

30. An audience responsive movie changeover system in accordance with claim 29 wherein said movie media comprises a stored coded command signal in said real time sampling interval, said detecting and sampling means further comprising command signal decoding and sampling control means for decoding said stored coded command signals and being operatively connected to said comparing means for initiating said comparison of said stored standard signal value with said concurrently sampled mass audience response.

31. An audience responsive movie changeover system in accordance with claim 30 wherein said standard signal value storage means further comprises said movie media, said control means further comprising means for initiating provision of said stored standard signal value from said movie media to said comparing means for enabling said comparison of said stored signal value with said sampled audience response.

32. In a movie changeover system comprising a pair of movie projection devices each having an associated portion of substantially continuous overall motion picture presentation therefrom, each of said movie media having stored thereon a projectable portion of said overall motion picture presentation content, and a real time changeover means operatively associated with said pair of projection devices for selectively projecting a movie display of solely one of said movie media projectable portions from one of said pair of projection devices in a real time continuous mass audience movie display presentation with the previous movie display portion in response to a changeover signal; the improvement comprising a decision tree movie presentation stored on said movie media, said stored overall motion picutre presentation content including said projectable portions thereof comprising said decision tree movie presentation, said stored decision tree movie presentation comprising first and second different branching choice movie display presentation portions at a common decision tree movie display branching point, each of said first and second branching choice movie display presentation portions having a different movie display content commonly associated with the display branching point and being substantially coextensive in movie display time from said common decision tree movie display branching point, each of said coextensive first and second branching choice movie display presentation portions being stored on a different one of said associated movie media, said preceding movie display portion content comprising a sampling interval prior to said common decision tree movie display branching point for sampling audience response of preferential selection of said first and second branching choice movie display presentation portions; means for detecting and sampling an audible first and second one of said mass audience responses, with each sampled mass audience audible response being associated with a different one of said first and second branching choice movie display presentation portions for providing corresponding first and second audience response preferential signals respectively therefrom during said sampling interval, each of said audience response preferential signals having a relative signal value dependent on the associated mass audience response; and condition responsive means operatively connected to said detecting and sampling means for selectively providing said changeover signal to said changeover means substantially at said common decision tree movie display branching point in response to said detected relative signal values for enabling said selective projection of solely said movie media projectable portion corresponding to the previously sampled preferential first or second branching choice of the sampled mass audience based on said detected mass audience audible responses, and changeover means enabling said substantially continuous real time movie display presentation of solely the preferentially selected first or second branching choice movie display representation portion substantially at said common decision tree movie display branching point, whereby a real time decision tree movie presentation having a variable movie display content dependent on mass audience response may be provided, said stored different branching choice movie presentations further comprising a plurality of different selectable ending display content presentations for said overall motion picture presentation content, said system further comprising ending selection logic means, said detecting and sampling means being operatively connected to said ending selection logic means for providing a plurality of audience ending preferential responses to said ending selection logic means based on said sampling of mass audience audible response of said ending display branching choice during an ending sampling interval, said ending selection logic means comprising means for detecting the most preferred ending display branching choice for said sampled mass audience audible responses for providing an audience ending preferential signal based thereon, said condition responsive changeover signal providing means further comprising output means operatively connected to said ending selection logic means for providing said changeover signal in response to said audience ending preferential signal.

33. An audience responsive movie changeover system in accordance with claim 32 wherein said ending selection logic means comprises counter means for incrementally storing a count as said audience ending preferential signal based on said detecting and sampling of said plurality of audience ending preferential responses, said counter storing the largest count said counter means being incremented by detecting said preferential audience ending responses associated with the most preferred ending, each of said stored ending display content presentations having an associated count value and an associated stored look for ending command signal, said counter means being decremented each time said look for ending command signal is detected until said stored count is zero, said ending selection logic means providing said audience ending preferential signal to said changeover signal providing means in response to said zero count of said counter means.

34. An audience responsive movie changeover system in accordance with claim 32 wherein said means for detecting and sampling said mass audience audible responses comprises microphone means for detecting audio level as said sampled audience ending preferential responses, said relative preferential response signal values being dependent on the detected audio level of said associated audience ending response.

35. An audience responsive movie changeover system in accordance with claim 34 wherein said system further comprises means for storing a standard signal value associated with one of said selectable ending display branching choices and for comparing said sampled audience ending preferential responses therewith for providing a changeover signal only when said preferential signal value associated with said sampled responses exceeds said stored signal value.

36. A method of providing a real time decision tree continuous movie presentation to a viewing mass audience having a variable movie display content dependent on said viewing mass audience response comprising the steps of real time selectably providing first and second selectable branching choice movie display presentation portions from different selectable movie media storing said portions thereon; each of said selectable branching choice movie display presentation portions comprising a different movie display content commonly associated with the movie display portion content preceding a common decision tree movie display branching point in said continuous movie presentation; concurrently sampling the audible response to said viewing mass audience viewing said preceding movie display portion content to a preferred choice between said first and second branching choice movie display presentation portions for providing a processed preferential choice signal; and selectively electronically switching between said different movie media at said common branching point directly in response to said preferential choice signal based on said concurrently sampled mass audience audible responses for real time displaying solely the movie display portion branch associated with the sampled preferential selection of said viewing mass audience during said continuous movie presentation.

37. A method in accordance with claim 36 wherein said concurrently sampling step further comprises the step of frequency discriminating between said concurrently sampled audience audible responses for determining said preferred choice.

38. A method in accordance with claim 37 further comprising the steps of recording a command signal on said movie media associated with said common branching point for enabling detection of a sampling interval for sampling said response and detecting said command signal for initiating said sampling of said response.

39. In a movie changeover system comprising a pair of movie projection devices each having an associated portion of a substantially continuous overall motion picture presentation therefrom, each of said movie media having stored thereon a projectable portion of said overall motion picture presentation content, and a real time changeover means operatively associated with said pair of projection devices for selectively projecting a movie display of one of said movie media projectable portions from one of said pair of projection devices in a real time continuous mass audience movie display presentation with the previous movie display portion in response to a changeover signal; the improvement comprising a decision tree movie presentation stored on said movie media, said stored overall motion picture presentation content including said projectable portions thereof comprising said decision tree movie presentation, said stored decision tree moving presentation comprising first and second different branching choice movie display presentation portions at a common decision tree movie display branching point, each of said first and second branching choice movie display presentation portions having a different movie display content commonly associated with the movie display branching point and being substantially coextensive in movie display time from said common decision tree movie display branching point, each of said coextensive first and second branching choice movie display presentation portions being stored on a different one of said associated movie media, said preceding movie display portion content comprising a sampling interval prior to said common decision tree movie display branching point for sampling mass audience response of preferential selection of said first and second branching choice movie display presentation portions; means for detecting and sampling an audible first and second one of said mass aduience responses, with each sampled mass audience audible response being associated with a different one of said first and second branching choice movie display presentation portions for providing corresponding first and second mass audience response preferential signals respectively therefrom during said sampling interval, each of said mass audience response preferential signals having a relative signal value dependent on the associated mass audience audible response; and condition responsive means operatively connected to said detecting and sampling means for selectively providing said changeover signal to said changeover means substantially at said common decision tree movie display branching point in respnnse to said detected relative signal values for enabling said selective projection of solely said movie media projectable portion corresponding to the previously sampled preferential first or second branching choice of the sampled mass audience based on said detected audience audible responses, and changeover means enabling said substantially continuous real time movie display presentation of solely the preferentially selected first or second branching choice movie display presentation portion substantially at said common decision tree movie display branching point; whereby a real time decision tree movie presentation having a variable movie display content dependent on mass audience response may be provided.

40. An audience responsive movie changeover system in accordance with claim 39 wherein said means for detecting and sampling said mass audience audible responses comprises microphone means for detecting audio level as said sampled audience responses, said relative preferential signal values being dependent on the detected audio level of said associated audience response.

41. An audience responsive movie changeover system in accordance with claim 40 wherein said means for detecting and sampling said audience responses further comprises sample and hold means operatively connected to said changeover signal providing means for sampling and holding said detected relative preferential signal values and providing said held values to said changeover signal providing means at a predetermined time relative to said common decision tree movie display branching point.

42. An audience responsive movie changeover system in accordance with claim 41 wherein said changeover signal providing means comprises voltage comparator means operatively connected to said sample and hold means for comparing the relative voltage signal values of said detected audience response audio levels and for providing said changeover signal based on said comparison.

43. An audience responsive movie changeover system in accordance with claim 42 wherein said changeover signal providing means further comprises output means for providing said changeover signal only when the one of the pair of movie media containing the branching choice movie display presentation content associated with the detected higher relative signal value preferential audience response is different from the movie media providing the preceeding movie display presentation at said common decision tree branching point.

44. An audience responsive movie changeover system in accordance with claim 43 wherein said changeover means comprises relay means operatively connected to said output means for selectively enabling said movie display projection from one of said movie projection devices in response to said changeover signal.

45. An audience responsive movie changeover system in accordance with claim 44 wherein said output means further comprises storage register means operatively connected to said comparator means for incrementing said storage register each time a changeover between movie media occurs for incrementally storing a number corresponding to an audience trend preferential characteristic.

46. An audience responsive movie changeover system in accordance with claim 45 wherein said storage register means comprises means for storing a preset number and for comparing said preset number with said incrementally stored number for selectively providing a changeover signal dependent on said number comparison for automatically selecting one of said movie media at a common passive audience decision tree branching point, whereby a subsequent movie display presentation portion may automatically be provided in accordance with the previous trend of the sampled audience.

47. An audience responsive movie changeover system in accordance with claim 46 wherein said movie media each comprise stored tones in said real-time sampling interval and said detecting and sampling means further comprise tone decoder and sampling control means for decoding said stored tones and initiating said sampling and said changeover signal provision in accordance with detection of predetermined ones of said decoded tones.

48. An audience responsive movie changeover system in accordance with claim 47 wherein said stored tones comprise a plurality of spaced apart tones, a different tone being associated with each of said two audience responses to be sampled and with said common decision tree branching point with which said changeover signal provision is associated.

49. An audience responsive movie changeover system in accordance with claim 48 wherein said movie media each comprises a plurality of different ones of said pairs of branching choice movie display presentation portions and associated common decision tree movie display branching points spaced throughout said stored decision tree movie presentation.

50. An audience responsive movie changeover system in accordance with claim 39 said means for detecting and sampling said audience responses comprises sample and hold means operatively connected to said changeover signal providing means for sampling and holding said detected relative preferential signal values and providing said held values to said changeover signal providing means at a predetermined time relative to said common decision tree movie display branching point.

51. An audience responsive movie changeover system in accordance with claim 39 wherein said changeover signal providing means comprises voltage comparator means operatively connected to said detecting and sampling means for comparing the relative voltage signal values of said detected audience responses and for providing said changeover signal based on said comparison.

52. An audience responsive movie changeover system in accordance with claim 51 wherein said changeover signal providing means further comprises output means for providing said changeover signal only when the one of the pair of movie media containing the branching choice movie display presentation content associated with the detected higher relative signal value preferential audience response is different from the movie media providing the preceeding movie display presentation at said common decision tree branching point.

53. An audience responsive movie changeover system in accordance with claim 52 wherein said changeover means comprises relay means operatively connected to said output means for selectively enabling said movie display projection from one of said movie projection devices in response to said changeover signal.

54. An audience responsive movie changeover system in accordance with claim 53 wherein said output means further comprises storage means operatively connected to said comparator means for incrementing said storage register each time a changeover between movie media occurs for incrementally storing a number corresponding to an audience trend preferential characteristic.

55. An audience responsive movie changeover system in accordance with claim 54 wherein said storage register means comprises means for storing a preset number and for comparing said preset number with said incrementally stored number for selectively providing a changeover signal dependent on said number comparison for automatically selecting one of said movie media at a common passive audience decision tree branching point, whereby a subsequent movie display presentation portion may automatically be provided in accordance with the previous trend of the sampled audience.

56. An audience responsive movie changeover system in accordance with claim 52 wherein said output means further comprises storage register means operatively connected to said comparator means for incrementing said storage register each time a changeover between movie media occurs for incrementally storing a number corresponding to an audience trend preferential characteristic.

57. An audience responsive movie changeover system in accordance with claim 56 wherein said storage register means comprises means for storing a preset number and for comparing said preset number with said incrementally stored number for selectively providing a changeover signal dependent on said number comparison for automatically selecting one of said movie media at a common passive audience decision tree branching point, whereby a subsequent movie display presentation portion may automatically be provided in accordance with the previous trend of the sampled audience.

58. An audience responsive movie changeover system in accordance with claim 51 wherein said output means further comprises storage register means operatively connected to said comparator means for incrementing said storage register each time a changeover between movie media occurs for incrementally storing a number corresponding to an audience trend preferential characteristic.

59. An audience responsive movie changeover system in accordance with claim 58 wherein said storage register means comprises means for storing a preset number and for comparing said preset number with said incrementally stored number for selectively providing a changeover signal dependent on said number comparison for automatically selecting one of said movie media at a common passive audience decision tree branching point, whereby a subsequent movie display presentation portion may automatically be provided in accordance with the previous trend of the sampled audience.

60. An audience responsive movie changeover system in accordance with claim 39 wherein said movie media each comprise stored tones in said real-time sampling interval and said detecting and sampling means further comprise tone decoder and sampling control means for decoding said stored tones and initiating said sampling and said changeover signal provision in accordance with detection of predetermined ones of said decoded tones.

61. An audience responsive movie changeover system in accordance with claim 60 wherein said stored tones comprise a plurality of spaced apart tones, a different tone being associated with each of said two audience responses to be sampled and with said common decision tree branching point with which said changeover signal provision is associated.

62. An audience responsive movie changeover system in accordance with claim 39 wherein said movie media each comprise a plurality of different ones of said pairs of branching choice movie display presentation portions and associated common decision tree movie display branching points spaced throughout said stored decision tree movie presentation.

63. An audience responsive movie changeover system in accordance with claim 39 wherein said movie media each comprise stored coded command signals in said real time sampling interval and said detecting and sampling means further comprise command signal decoding and sampling control means for decoding said stored coded command signals and initiating said sampling and said changeover signal provision in accordance with detection of predetermined ones of said decoded command signals.

64. An audience responsive movie changeover system in accordance with claim 63 wherein said stored coded command signals comprise a plurality of unique command signals indicative of command control functions for initiating said sampling and said changeover signal provision in accordance with detection of predetermined unique ones of said decoded command signals, said sampling means and said changeover signal providing means being responsive to said unique command signals, said unique command signals being stored on said movie media.

65. An audience responsive movie changeover system in accordance with claim 63 wherein said unique command signals each comprise a combination of different unique tone frequencies corresponding to a different command function, said decoder means further comprising tone decoder and decoder logic means responsive to detection of said different unique tone frequencies for initiating a unique command function in said movie changeover system.

66. An audience responsive movie changeover system in accordance with claim 65 wherein said unique command signals comprise a combination of four different unique tone frequencies.

67. An audience responsive movie changeover system in accordance with claim 66 wherein one of said tone frequencies comprises a command enable signal for enabling said movie changeover system to respond to detection of said unique command signals for performing said command functions.

68. An audience responsive movie changeover system in accordance with claim 63 wherein said unique command signals each comrpise different burst tone train lengths, said decoder means further comprising tone decoder and decoder logic and counting means responses to detection of said different burst tone trains for counting said detected burst tone train and initiating a unique command function in said movie changeover system in response to said count.

69. A method for providing a real time decision tree continuous movie presentation to a viewing mass audience having a variable movie display content dependent on said vewing mass audience audible response comprising the steps of real time selectably providing first and second selectable branching choice movie display presentation portions of said continuous decision tree movie presentation from different selectable movie media storing said portions thereon; each of said selectable branching choice movie display presentation portions comprising a different movie content commonly associated with the movie display portion content preceding a common decision tree movie display branching point in said continuous movie presentation; sampling the audible response of said viewing mass audience viewing said preceding movie display portion content to a preferred choice between said first and second branching choice movie display presentation portions for providing a processed preferential choice signal; and selectively electronically switching between said different movie media at said common branching point directly in response to said preferential choice signal based on said sampled mass audience audible responses for real time displaying solely the movie display portion branch associated with the sampled preferential selection of said viewing mass audience during said continuous movie presentation.

70. A method in accordance with claim 69 further comprising the steps of providing a plurality of different pairs of said first and second selectable branching choice movie display presentation portions at a plurality of different corresponding branching points throughout said movie presentation sampling the audible response of said viewing audience to said plurality of choices, and selectively changing between said different movie media at said corresponding branching points for providing a plurality of mass audience responsive movie presentation portions throughout the course of the movie presentation.

71. A method in accordance with claim 69 further comprising the steps of recording a command signal on said movie media associated with said common branching point for enabling detection of a sampling interval for sampling said response and detecting said command signal for initiating said sampling of said response.

72. A method in accordance with claim 71 wherein said recording and detecting steps comprise recording a combination of different frequency tones to provide said command signal.

73. A method in accordance with claim 72 wherein said recording and detecting steps further comprise recording a plurality of different unique command signals on said movie media associated with said common branching point, a different combination of said different frequency tones corresponding to a different command signal associated with said response sampling and selective changing.

74. A method in accordance with claim 71 wherein said recording and detecting steps comprise recording a burst tone train of predetermined length to provide said command signal.

75. A method in accordance with claim 74 wherein said recording and detecting steps further comprise recording a plurality of different unique command signals on said movie media associated with said common branching point, a different predetermined burst train length corresponding to a different command signal associated with said response sampling and selective changing.

76. A method for recording a movie capable of providing a real time decision tree continuous movie presentation to a viewing mass audience having a variable movie display content dependent on said viewing mass audience audible response comprising the steps of recording first and second selectable branching choice movie display presentation portions of a common continuous decision tree movie presentation on a pair of different movie media, each of said portions being associated with common branching point in said continuous movie presentation and being substantially coextensive in movie display time from said common branching point and comprising a different movie display content commonly associated with the recorded movie display portion content preceding said common branching point in said continuous movie presentation; and recording a command signal on each of said movie media associated with said common branching point for enabling electronic detection of a sampling interval for sampling the audible response of said viewing mass audience viewing said preceding recorded movie display portion content to a preferred choice between said first and second recorded branching choice movie display presentation portions for enabling selective electronic switching between said different movie media at said common branching point in response to a preferential choice signal obtained from said sampled mass audience response for enabling real time display of the movie display portion branch associated with the sampled preferential selection of said viewing mass audience during said continuous movie presentation of said recorded movie media.

77. A method in accordance with claim 76 wherein said command signal recording step comprises recording a combination of different frequency tones to provide said command signal.

78. A method in accordance with claim 77 said command signal recording step further comprises recording a plurality of different unique command signals on said movie media associated with said common branching point.

79. A method in accordance with claim 76 wherein said command signal recording step comprises recording a burst tone train of predetermined length to provide said command signal.

80. A method in accordance with claim 79 wherein said command signal recording step further comprises recording a plurality of different unique command signals on said movie media associated with said common branching point, a different predetermined burst train length corresponding to a different command signal associated with said mass audience audible response sampling and selective changing.

* * * * *

UNITED STATES PATENT AND TRADEMARK OFFICE
CERTIFICATE OF CORRECTION

PATENT NO. : 4,591,248

DATED : May 27, 1986

INVENTOR(S) : Michael J. Freeman

It is certified that error appears in the above-identified patent and that said Letters Patent is hereby corrected as shown below:

```
Column 18, line 63: "bracnhing" should read --branching--
Column 23, line 37: "dispaly" should read --display--
Column 23, line 45: "banching" should read --branching--
Column 24, line 58: "picutre" should read --picture--
Column 27, line 44: "respnnse" should read --response--
Column 31, line 40: "vewing" should read --viewing--
Column  4, line 29: "tomes" should read --tones--
```

Signed and Sealed this

Seventeenth Day of February, 1987

Attest:

DONALD J. QUIGG

Attesting Officer

Commissioner of Patents and Trademarks